(12) United States Patent
Kanno et al.

(10) Patent No.: US 12,487,539 B2
(45) Date of Patent: Dec. 2, 2025

(54) FINE PARTICLE, EXTERNAL ADDITIVE FOR TONERS, AND TONER

(71) Applicant: CANON KABUSHIKI KAISHA, Tokyo (JP)

(72) Inventors: Ichiro Kanno, Chiba (JP); Hiroki Watanabe, Chiba (JP); Masaharu Miura, Ibaraki (JP); Hayato Ida, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 646 days.

(21) Appl. No.: 17/823,592

(22) Filed: Aug. 31, 2022

(65) Prior Publication Data

US 2023/0086689 A1   Mar. 23, 2023

(30) Foreign Application Priority Data

Sep. 7, 2021 (JP) ............................ 2021-145416
Jul. 26, 2022 (JP) ............................ 2022-119074

(51) Int. Cl.
*G03G 9/097* (2006.01)
*C08G 77/04* (2006.01)
*G03G 9/08* (2006.01)

(52) U.S. Cl.
CPC ........ *G03G 9/09775* (2013.01); *C08G 77/04* (2013.01); *G03G 9/0819* (2013.01); *G03G 9/0821* (2013.01); *G03G 9/0825* (2013.01); *G03G 9/0827* (2013.01)

(58) Field of Classification Search
CPC ........ G03G 9/09775; C08G 77/04; C08J 3/14
See application file for complete search history.

(56) References Cited

U.S. PATENT DOCUMENTS

| | | | |
|---|---|---|---|
| 9,057,970 B2 | 6/2015 | Ida |
| 9,152,088 B1 | 10/2015 | Kobori |
| 9,348,247 B2 | 5/2016 | Ida |
| 9,348,253 B2 | 5/2016 | Kanno |
| 9,417,540 B2 | 8/2016 | Hashimoto |
| 9,436,112 B2 | 9/2016 | Iwasaki |
| 9,540,483 B2 | 1/2017 | Ida |
| 9,651,883 B2 | 5/2017 | Hama |
| 9,665,023 B2 | 5/2017 | Kamae |
| 9,665,026 B2 | 5/2017 | Iwasaki |
| 9,696,644 B2 | 7/2017 | Ida |
| 9,897,934 B2 | 2/2018 | Tamura |
| 9,915,885 B2 | 3/2018 | Katsumata |
| 9,969,834 B2 | 5/2018 | Ohtsu |
| 10,012,918 B2 | 7/2018 | Ishigami |
| 10,012,920 B2 | 7/2018 | Shibata |
| 10,012,921 B2 | 7/2018 | Kamae |
| 10,036,970 B2 | 7/2018 | Kanno |
| 10,078,281 B2 | 9/2018 | Ida |
| 10,082,743 B2 | 9/2018 | Hama |
| 10,088,765 B2 | 10/2018 | Miyakai |
| 10,133,201 B2 | 11/2018 | Kamae |
| 10,146,146 B2 | 12/2018 | Kenmatsu |
| 10,175,595 B2 | 1/2019 | Onozaki |
| 10,197,936 B2 | 2/2019 | Onozaki |
| 10,203,619 B2 | 2/2019 | Yamashita |
| 10,216,108 B2 | 2/2019 | Iwasaki |
| 10,228,629 B2 | 3/2019 | Tamura |
| 10,234,777 B2 | 3/2019 | Ohtsu |
| 10,274,851 B2 | 4/2019 | Hashimoto |
| 10,353,312 B2 | 7/2019 | Kamae |
| 10,401,748 B2 | 9/2019 | Hashimoto |
| 10,423,086 B2 | 9/2019 | Hama |
| 10,423,090 B2 | 9/2019 | Ohtsu |
| 10,451,985 B2 | 10/2019 | Takahashi |
| 10,451,986 B2 | 10/2019 | Sano |
| 10,451,990 B2 | 10/2019 | Kamae |
| 10,474,049 B2 | 11/2019 | Onozaki |
| 10,514,624 B2 | 12/2019 | Tamura |
| 10,551,759 B2 | 2/2020 | Watanabe |
| 10,564,560 B2 | 2/2020 | Onozaki |
| 10,599,060 B2 | 3/2020 | Kanno |

(Continued)

FOREIGN PATENT DOCUMENTS

| | | | | |
|---|---|---|---|---|
| JP | 2007-99582 A | 4/2007 | | |
| JP | 2009-173802 A | 8/2009 | | |
| JP | 2016-80886 A | 5/2016 | | |
| JP | 2020-29547 A | 2/2020 | | |
| JP | 2020-66680 A | 4/2020 | | |
| JP | 2020066680 A | * 4/2020 | ............. | C08G 77/04 |
| WO | 2015/107961 A1 | 7/2015 | | |

OTHER PUBLICATIONS

Machine translation of JP 2020-066680—Oshima (Year: 2025).*
Machine translation of JP 2020-066680 Oshima et al (Year: 2025).*
U.S. Appl. No. 17/663,935, Miki Ueda, filed May 18, 2022.
U.S. Appl. No. 17/664,102, Megumi Shino, filed May 19, 2022.
U.S. Appl. No. 18/053,462, Kouichirou Ochi, filed Nov. 8, 2022.

*Primary Examiner* — Peter L Vajda
*Assistant Examiner* — Grant Steven Seiler
(74) *Attorney, Agent, or Firm* — VENABLE LLP

(57) ABSTRACT

A fine particle of a silicon polymer, wherein the fine particle has pores; the total pore volume of the fine particle is 0.35 to 1.00 cm$^3$/g; a number-average primary particle diameter of the fine particle is 0.05 to 0.30 μm; the silicon polymer has a siloxane bond and an Si—R$^1$ bond; R$^1$ represents an alkyl group having 1 to 6 carbon atoms; and designating, with reference to a chart obtained by $^{29}$Si-NMR measurement of the fine particle, A as a total peak area corresponding to the silicon polymer, and B as a peak area corresponding to Si—R$^1$, A and B satisfy a following formula (1):

$$10.0 \leq B/A \times 100 \leq 45.0 \qquad (1).$$

12 Claims, No Drawings

(56) References Cited

U.S. PATENT DOCUMENTS

| | | |
|---|---|---|
| 10,642,178 B2 | 5/2020 | Yamashita |
| 10,656,545 B2 | 5/2020 | Kamae |
| 10,747,132 B2 | 8/2020 | Takahashi |
| 10,768,543 B2 | 9/2020 | Tsujimoto |
| 10,775,710 B1 | 9/2020 | Kamae |
| 10,859,931 B2 | 12/2020 | Hashimoto |
| 10,877,386 B2 | 12/2020 | Murayama |
| 10,935,902 B2 | 3/2021 | Kanno |
| 10,955,765 B2 | 3/2021 | Onozaki |
| 10,969,705 B2 | 4/2021 | Shirayama |
| 11,029,617 B2 | 6/2021 | Chimoto |
| 11,131,939 B2 | 9/2021 | Hama |
| 11,181,848 B2 | 11/2021 | Ochi |
| 11,249,410 B2 | 2/2022 | Takahashi |
| 11,429,032 B2 | 8/2022 | Shibata |
| 2013/0108955 A1 | 5/2013 | Shibata |
| 2013/0288173 A1 | 10/2013 | Hashimoto |
| 2014/0329176 A1 | 11/2014 | Kanno |
| 2015/0099227 A1 | 4/2015 | Ida |
| 2016/0319077 A1* | 11/2016 | Ishizu et al. ........... C08G 77/04 |
| 2018/0275540 A1 | 9/2018 | Matsuo |
| 2018/0314176 A1 | 11/2018 | Ikeda |
| 2021/0141315 A1 | 5/2021 | Kamae |
| 2021/0181647 A1 | 6/2021 | Hashimoto |
| 2021/0181649 A1 | 6/2021 | Kanno |
| 2021/0181650 A1 | 6/2021 | Hama |
| 2021/0181651 A1 | 6/2021 | Kanno |
| 2021/0278774 A1 | 9/2021 | Hashimoto |
| 2021/0278775 A1 | 9/2021 | Kamae |
| 2021/0286282 A1 | 9/2021 | Kobori |
| 2021/0397106 A1 | 12/2021 | Kobori |
| 2022/0187728 A1 | 6/2022 | Miura |
| 2022/0197163 A1 | 6/2022 | Kajihara |
| 2022/0197166 A1 | 6/2022 | Chimoto |
| 2022/0197174 A1 | 6/2022 | Kajihara |
| 2022/0236654 A1 | 7/2022 | Watanabe |
| 2022/0236655 A1 | 7/2022 | Kanno |
| 2022/0236656 A1 | 7/2022 | Kanno |
| 2022/0252995 A1 | 8/2022 | Tsujimoto |
| 2022/0299901 A1 | 9/2022 | Murata |
| 2022/0299902 A1 | 9/2022 | Abe |
| 2022/0326630 A1 | 10/2022 | Hashimoto |
| 2022/0342335 A1 | 10/2022 | Ochi |

* cited by examiner

FINE PARTICLE, EXTERNAL ADDITIVE FOR TONERS, AND TONER

BACKGROUND OF THE INVENTION

Field of the Invention

The present disclosure relates to a fine particle and an external additive for toners, and to a toner that uses said external additive for toners and is for use in electrophotographic systems.

Description of the Related Art

Accompanying the widespread dissemination in recent years of electrophotographic system-based full-color copiers, there have also been additional increases in the requirements on electrophotographic toners with regard to environmental stability, longer life, and the ability to accommodate higher printing speeds. The use of silica as an external additive for toners is generally widely known to date. Examples of the execution of a surface treatment on silica yielded by a dry method or wet method (sol-gel method) in order to increase the hydrophobicity have been generally reported.

For example, Japanese Patent Application Laid-open No. 2007-099582 provides an example in which the charge stability of toner is improved by the addition, to the toner base particle, of highly hydrophobic spherical sol-gel silica fine particles.

In another example, the environmental stability and charge stability of toner is improved by specifying the pore volume and silanol group titer of the silica, as in Japanese Patent Application Laid-open No. 2016-080886.

SUMMARY OF THE INVENTION

However, when image output is performed over a long term in a high-temperature, high-humidity environment, the silica present on the toner surface is readily influenced by the moisture present within the image output device unit and changes in the state of the toner surface may end up occurring. The charging performance of the toner is changed by this and variations in the image density then end up occurring. In addition, for example, under conditions in which the toner is subjected to large stresses, e.g., the high-volume output of a low-print-percentage image, the image may undergo variations in color, and there is still room for improvement with regard to the charge stability of toner and the stability of toner during durability testing.

On the other hand, there is an example in WO 2015/107961 of improving the flowability and charge stability of toners through the addition to the toner base particle of polyalkylsilsesquioxane fine particles.

However, there are problems with all of this art with regard to the hygroscopicity of the external additive and stability during durability testing when image output is performed in a high-temperature, high-humidity environment and when a low-print-percentage image is output in large quantities, and it has been found that there is room for improvement in terms of the image density stability and image environmental stability.

The present disclosure provides: a fine particle that exhibits stability during durability testing and charge stability in high-temperature, high-humidity environments and that can suppress density fluctuations regardless of the image print percentage; an external additive for toners; and a toner that uses this external additive for toners.

The present disclosure relates to a fine particle of a silicon polymer, wherein
the fine particle has pores;
the total pore volume of the fine particle is 0.35 to 1.00 $cm^3/g$;
a number-average primary particle diameter of the fine particle is 0.05 to 0.30 μm;
the silicon polymer has a siloxane bond and an $Si-R^1$ bond;
$R^1$ represents an alkyl group having 1 to 6 carbon atoms; and
designating, with reference to a chart obtained by $^{29}Si$-NMR measurement of the fine particle, A as a total peak area corresponding to the silicon polymer, and B as a peak area corresponding to $Si-R^1$, A and B satisfy a following formula (1):

$$10.0 \leq B/A \times 100 \leq 45.0 \tag{1}$$

The present disclosure can thus provide: a fine particle that exhibits stability during durability testing and charge stability in high-temperature, high-humidity environments and that can suppress density fluctuations regardless of the image print percentage; an external additive for toners; and a toner that uses this external additive for toners. Further features of the present invention will become apparent from the following description of exemplary embodiments.

DESCRIPTION OF THE EMBODIMENTS

In the present disclosure, the notations "from XX to YY" and "XX to YY" representing a numerical value range denote, unless otherwise stated, a numerical value range that includes the lower limit and the upper limit thereof, as endpoints. In a case where numerical value ranges are described in stages, the upper limits and the lower limits of the respective numerical value ranges can be combined arbitrarily.

The present inventors believe the following with regard to the mechanisms by which the aforementioned effects are produced. Conventionally, the typical sol-gel silica particles that have been used as external additives for toners have up to now been particles in which the main component has been the siloxane bond (Si—O—Si). Since generally the silanol group is present at the terminals in sol-gel silica particles, unreacted residual silanol groups are present at the surface and in the interior of the silica particle. This residual silanol group binds with water molecules present in the air, and due to this the toner charging performance ends up declining during long-term use in a high-temperature, high-humidity environment. In addition, it is difficult for the incorporated moisture to be released from the pores present in silica particles, and a decline in toner charging performance is caused as a result. The toner charging performance thus readily declines when sol-gel silica particles are used in high-temperature, high-humidity environments.

As a result of intensive investigations, the present inventors discovered that the aforementioned problems can be solved by optimizing the pore volume of the fine particle and optimizing the amount of occurrence of $Si-R^1$ ($R^1$ is a $C_{1-6}$ alkyl group) in the interior of the fine particle. It is thought that via these mechanisms the penetration of moisture into the pores of the fine particle is impeded due to the introduction of an alkyl group, e.g., $SiCH_3$, into the fine particle, and the hydrophobicity is then increased. In addition, it is hypothesized that fluctuations in the toner charge quantity in high-temperature, high-humidity environments are inhibited, and that fluctuations in the surface state of the toner induced by the output of low-print-percentage images are inhibited, due to a relaxation of external stresses and due to a stable surface charge brought about by having a suitable pore volume. It is further hypothesized that the stability in durability testing can be improved, and fogging after use in durability testing can be suppressed, because—by having a suitable pore volume—external stresses can be relaxed and fluctuations in the toner charge quantity can be inhibited.

The present disclosure relates to a fine particle of a silicon polymer, wherein
the fine particle has pores;
the total pore volume of the fine particle is 0.35 to 1.00 cm$^3$/g;
a number-average primary particle diameter of the fine particle is 0.05 to 0.30 μm;
the silicon polymer has a siloxane bond and an Si—R$^1$ bond;
R$^1$ represents an alkyl group having 1 to 6 carbon atoms; and
designating, with reference to a chart obtained by $^{29}$Si-NMR measurement of the fine particle, A as a total peak area corresponding to the silicon polymer, and B as a peak area corresponding to Si—R$^1$, A and B satisfy a following formula (1):

$$10.0 \leq B/A \times 100 \leq 45.0 \quad (1).$$

The fine particle has pores and the total pore volume of the fine particle is 0.35 cm$^3$/g to 1.00 cm$^3$/g. Specifically, this refers to the total pore volume of the fine particle as measured by the BJH method for pore diameters in the range from 1.7 nm to 300.0 nm.

The fine particle cannot engage in the relaxation of stresses received from, e.g., members, when the total pore volume of the fine particle is less than 0.35 cm$^3$/g. As a consequence, the fine particle is embedded into the toner particle surface and the toner attachment force varies and as a result fluctuations in image color brought about by fluctuations in the toner laid-on level on the paper cannot be suppressed.

When the total pore volume of the fine particle exceeds 1.00 cm$^3$/g, the proportion of the pore volume in the total volume of the fine particle is then too high and the fine particle takes on an unsatisfactory mechanical strength, and as a consequence crushing of the fine particle itself—by stresses received from, e.g., members—ends up occurring. Due to this, the toner attachment force varies and as a result fluctuations in image color brought about by fluctuations in the toner laid-on level on the paper cannot be suppressed.

The total pore volume of the fine particle is preferably from 0.35 cm$^3$/g to 0.80 cm$^3$/g, more preferably from 0.40 cm$^3$/g to 0.60 cm$^3$/g, and still more preferably from 0.41 cm$^3$/g to 0.50 cm$^3$/g. The total pore volume of the fine particle can be controlled using the following during the wet production method: the hydrolysis and condensation reaction conditions (reaction temperature, reaction time, stirring time), the pH during the reaction, the type of catalyst, and the monomer charge ratios.

The following are examples of methods for increasing the total pore volume: increasing the mixing ratio of difunctional silane, lowering the temperature during the condensation reaction, shortening the stirring time, lowering the pH of the solution, and lowering the temperature during hydrolysis. The temperature during the condensation reaction has a particular influence on pore formation, and, by controlling the temperature range during the condensation reaction to 15 to 25° C., siloxane bond formation is inhibited and bringing the total pore volume of the fine particle into the stipulated range is facilitated. The following are examples of methods for lowering the total pore volume: increasing the mixing ratio of tetrafunctional silane, raising the temperature during the condensation reaction, extending the stirring time, raising the pH of the solution, and raising the temperature during hydrolysis.

The silicon polymer has the siloxane bond and an Si—R$^1$ bond (R$^1$ represents a C$_{1-6}$ alkyl group). In addition, designating, with reference to a chart obtained by $^{29}$Si-NMR measurement of the fine particle, A as a total peak area corresponding to the silicon polymer, and B as a peak area corresponding to Si—R$^1$, A and B satisfy a following formula (1).

$$10.0 \leq B/A \times 100 \leq 45.0 \quad (1)$$

In $^{29}$Si-NMR, peaks are detected in different shift regions depending on the structure of the functional group bonded to the Si in the constituent compounds of the silicon polymer. The structures bonded to Si can be identified by identifying each peak position using a reference sample. In addition, the occurrence ratio of each constituent compound can be calculated from the obtained peak areas. This can be sought by calculation of the proportion of the M unit structure (S1), D unit structure (S2), T unit structure (S3), and Q unit structure (S4) with reference to the total peak area.

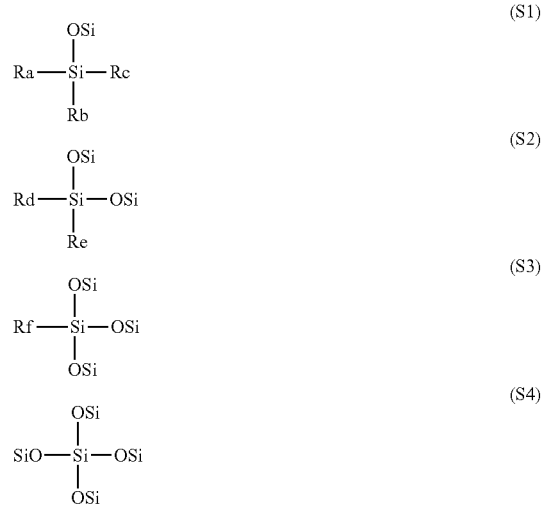

The Ra, Rb, Rc, Rd, Re, and Rf each independently represent an alkyl group having 1 to 6 (preferably 1 to 3, more preferably 1 or 2, and even more preferably 1) carbon atoms.

The proportion (B/A) of the peak area B corresponding to the Si—R$^1$ bond in this total peak area A is the occurrence ratio of the Si—R$^1$ bond present in the fine particle. Si—R$^1$ indicates that at least one or more C$_{1-6}$ alkyl groups are bonded to the Si. For example, it is the total of the fractions, contained in the aforementioned S1, S2, and S3, in which a C$_{1-6}$ alkyl group is bonded to Si. By satisfying formula (1), the amount of alkyl group present in the vicinity of the pores within the fine particle becomes optimal and the environmental stability of the toner and the charge stability of the toner can be improved.

$$10.0 \leq B/A \times 100 \leq 45.0 \quad (1)$$

The $R^1$ in Si—$R^1$ represents an alkyl group having 1 to 6 (preferably 1 to 3, more preferably 1 or 2, and even more preferably 1) carbon atoms.

When B/A×100 is less than 10.0, the amount of alkyl group present in the vicinity of the pores within the fine particle is then too small, and as a consequence moisture is readily taken into the pores and the charge stabilization effect in high-temperature, high-humidity environments does not appear. When B/A×100 exceeds 45.0, the amount of siloxane bond present in the vicinity of the pores within the fine particle is then relatively low, and as a consequence the pores become starting points when external stresses are received and breakage and crushing are then easily produced. That is, the durability of the fine particle itself is ultimately lowered.

20.0≤B/A×100≤45.0 is preferred, 25.0≤B/A×100≤40.0 is more preferred, and 25.0≤B/A×100≤35.0 is still more preferred. When these ranges are obeyed, toner stability during durability testing and the charge stability in high-temperature, high-humidity environments are further improved based on the aforementioned considerations.

The method for producing the silicon polymer fine particle is not particularly limited, but particle formation via the hydrolysis and condensation polymerization reactions of silicon compounds (silane monomer) using the sol-gel method is preferred. Specifically preferred is particle formation by inducing polymerization via the hydrolysis and condensation polymerization reactions of a mixture of difunctional silane having two siloxane bonds with tetrafunctional silane having four siloxane bonds. The silane monomer, e.g., difunctional silane and tetrafunctional silane, is described below.

That is, the silicon polymer preferably is a condensation polymer from at least one silicon compound selected from the group consisting of difunctional silanes and at least one silicon compound selected from the group consisting of tetrafunctional silanes. The proportion for the difunctional silane is preferably 50 mol % to 75 mol % and more preferably 55 mol % to 70 mol %. The proportion for the tetrafunctional silane is preferably 25 mol % to 50 mol % and more preferably 30 mol % to 45 mol %.

The present inventors discovered that the effects described above are generated by adjusting, for example, the following in the fine particle production method: the mixing ratio for the aforementioned monomers, the solvent temperature during the hydrolysis and condensation reactions, the type of catalyst, the stirring time, and the pH of the solution.

The following are examples of methods for increasing B/A: increasing the mixing ratio of difunctional silane, lowering the temperature during the condensation reaction, shortening the stirring time, lowering the pH of the solution, and lowering the temperature during the hydrolysis reaction. The following are examples of methods for lowering B/A: increasing the mixing ratio of tetrafunctional silane, raising the temperature during the condensation reaction, extending the stirring time, raising the pH of the solution, and raising the temperature during hydrolysis.

The fine particle of the present disclosure has a particle of a silicon polymer having a siloxane bond. The particle of the silicon polymer preferably contains the silicon polymer at 90% by mass or more, and more preferably at 95% by mass or more.

The method for producing the silicon polymer particles is not particularly limited, and for instance the silicon polymer particles may be obtained through dropping of a silane compound onto water, to elicit hydrolysis and a condensation reaction mediated by a catalyst, followed by filtration and drying of the obtained suspension. Particle diameter can be controlled on the basis of for instance the type of the catalyst, the compounding ratio, the reaction start temperature and the dropping time. Examples of the catalyst include, although not limited thereto, acidic catalysts such as hydrochloric acid, hydrofluoric acid, sulfuric acid and nitric acid, and basic catalysts such as aqueous ammonia, sodium hydroxide and potassium hydroxide.

The silicon polymer particles are preferably produced in accordance with the method below. Specifically, the method preferably includes a first step of obtaining a hydrolysis product of a silicon compound; a second step of mixing the resulting hydrolysis product and an alkaline aqueous medium, to elicit a polycondensation reaction of the hydrolysis product; and a third step of mixing the polycondensation reaction product and an aqueous solution, to elicit particle formation. In some cases, hydrophobicized spherical silicon polymer particles may be obtained by further mixing a hydrophobic agent into a dispersion of spherical silicon polymer particles.

In the first step, the silicon compound and a catalyst are brought into contact with each other by a method such as stirring or mixing in an aqueous solution in which an acidic or alkaline substance serving as a catalyst is dissolved in water. As the catalyst, a known catalyst can be preferably used. Specifically, examples of suitable acidic catalysts include acetic acid, hydrochloric acid, hydrofluoric acid, sulfuric acid, nitric acid, and the like, and examples of suitable basic catalysts include aqueous ammonia, sodium hydroxide, potassium hydroxide, and the like.

The amount of the catalyst used may be adjusted, as appropriate, depending on the silicon compound and the type of catalyst. Preferably, the amount of the catalyst used is selected in the range of from $1 \times 10^{-3}$ part by mass to 1 part by mass with respect to 100 parts by mass of water used when hydrolyzing the silicon compound.

Where the amount of the catalyst used is $1 \times 10^{-3}$ parts by mass or more, the reaction proceeds sufficiently. Meanwhile, where the amount of the catalyst used is 1 part by mass or less, the concentration of impurities remaining in the fine particles becomes low, and hydrolysis becomes easy. The amount of water used is preferably from 2 mol to 15 mol with respect to 1 mol of the silicon compound. When the amount of water is 2 mol or more, the hydrolysis reaction proceeds sufficiently, and when the amount of water is 15 mol or less, the productivity is improved.

The reaction temperature is not particularly limited, and the reaction may be conducted at normal temperature or in a heated state, but preferably the reaction is conducted in a state where the temperature is held at from 10 to 60° C., since in that case the hydrolysis product is obtained in a short time and partial condensation reactions of the generated hydrolysis product can be suppressed. The reaction time is not particularly limited, and may be selected as appropriate taking into consideration the reactivity of the silicon compound that is used, the composition of the reaction solution resulting from formulating the silicon compound, the acid and water, and productivity.

In the method for producing the silicon polymer particles, the second step involves mixing the starting solution obtained in the first step and an alkaline aqueous medium, to elicit a polycondensation reaction of a particle precursor. A polycondensation reaction solution is obtained as a result. The alkaline aqueous medium is a solution obtained by mixing an alkaline component, water and, as needed, an organic solvent or the like.

The alkaline component used in the alkaline aqueous medium exhibits basicity, and acts as a neutralizer of the catalyst used in the first step, and as a catalyst of the polycondensation reaction in the second step. Examples of such alkaline components include alkali metal hydroxides such as lithium hydroxide, sodium hydroxide and potassium hydroxide; ammonia; and organic amines such as monomethylamine and dimethylamine.

The use amount of the alkaline component is an amount such that the alkaline component neutralizes an acid and effectively acts as a catalyst of the polycondensation reaction; in a case for instance where ammonia is used as the alkaline component, the amount of the alkaline component may ordinarily be selected within the range from 0.01 mass % to 12.5 mass % relative to 100 parts by mass of the mixture of water and the organic solvent.

In the second step, an organic solvent may be further used in addition to the alkaline component and water, in order to prepare the alkaline aqueous medium. The organic solvent is not particularly limited, so long as it is compatible with water, but an organic solvent is preferable herein that dissolves 10 g or more of water per 100 g at normal temperature and a normal pressure.

Specific examples of the organic solvent include alcohols such as methanol, ethanol, n-propanol, 2-propanol and butanol; polyhydric alcohols such as ethylene glycol, diethylene glycol, propylene glycol, glycerine, trimethylolpropane and hexanetriol; ethers such as ethylene glycol monoethyl ether, acetone, diethyl ether, tetrahydrofuran and diacetone alcohol; and amide compounds such as dimethylformamide, dimethylacetamide and N-methylpyrrolidone.

Alcohol solvents such as methanol, ethanol, 2-propanol or butanol are preferable among the organic solvents enumerated above. In terms of hydrolysis and a dehydration condensation reaction, it is more preferable to select, as the organic solvent, the same alcohol as the alcohol that is eliminated.

The third step involves mixing the polycondensation reaction product obtained in the second step with an aqueous solution, to elicit formation of particles. Water (tap water, pure water or the like) can be suitably used herein as the aqueous solution, but components that are compatible with water, such as salts, acids, alkalis, organic solvents, surfactants or water-soluble polymers may be further added to the water. The temperatures of the polycondensation reaction solution and of the aqueous solution at the time of mixing are not particularly limited, and herein a range from 5 to 70° C. is suitably selected taking into consideration for instance the composition of the solutions, and productivity.

A known method may be adopted, without particular limitations, as the method for recovering the silicon polymer particles. For instance a floating powder may be scooped or filtered, but filtration is preferable since the operation involved is simple and convenient. The filtration method is not particularly limited, and a known apparatus for vacuum filtration, centrifugal filtration, pressure filtration or the like may be selected herein. The filter paper, filter, filter cloth or the like used for filtration are not particularly limited so long these are industrially available, and may be selected as appropriate depending on the apparatus that is used.

The hydrophobicity of the silicon polymer particles may be adjusted by treating the surface of the silicon polymer particles using a known means such as a silane coupling agent or silicone oil.

The monomers used can be selected, as appropriate, depending on the compatibility with the solvent and the catalyst, hydrolyzability, etc., but the tetrafunctional silane is preferably tetraethoxysilane. The bifunctional silane is preferably dimethyldimethoxysilane.

The silicon polymer preferably is a condensation polymer of at least one silicon compound selected from the group consisting of silicon compounds having a structure given by a following formula (A).

(A)

In formula (A), $R^{12}$, $R^{13}$, $R^{14}$, and $R^{15}$ each independently represent an alkyl group having from 1 to 6 (preferably from 1 to 3 and more preferably 1 or 2) carbons, a phenyl group, or a reactive group (for example, a halogen atom, hydroxy group, acetoxy group, or alkoxy group (having preferably from 1 to 6 carbons and more preferably from 1 to 3 carbons)). At least one of $R^{12}$, $R^{13}$, $R^{14}$, and $R^{15}$ is the reactive group.

Preferably $R^{12}$, $R^{13}$, $R^{14}$, and $R^{15}$ each independently represent an alkyl group having from 1 to 6 (preferably from 1 to 3 and more preferably 1 or 2) carbons or an alkoxy group (having preferably from 1 to 6 carbons and more preferably from 1 to 3 carbons).

The following can be used to obtain the silicon polymer particle: silicon compounds (tetrafunctional silanes) with formula (A) having four reactive groups in each molecule; organosilicon compounds (trifunctional silanes) with formula (A) in which $R^2$ is an alkyl group or the phenyl group, and which have three reactive groups ($R^{13}$, $R^{14}$, $R^{15}$); organosilicon compounds (difunctional silanes) with formula (A) in which $R^{12}$ and $R^{13}$ are an alkyl group or the phenyl group, and which have two reactive groups ($R^{14}$, $R^{15}$); and organosilicon compounds (monofunctional silanes) with formula (A) in which $R^2$, $R^{13}$, and $R^{14}$ are an alkyl group or the phenyl group, and which have one reactive group ($R^{15}$). When $R^{12}$ to $R^{14}$ in these silicon compounds are not reactive groups, $C_{1-6}$ alkyl groups are then preferred for $R^{12}$ to $R^{14}$.

The silicon polymer particle can be obtained by forming a crosslinked structure by bringing about the hydrolysis, addition polymerization, and condensation polymerization of these reactive groups. The hydrolysis, addition polymerization, and condensation polymerization of $R^{13}$, $R^{14}$, and $R^{15}$ can be controlled using the reaction temperature, reaction time, reaction solvent, and pH.

The tetrafunctional silane can be exemplified by tetramethoxysilane, tetraethoxysilane, and tetraisocyanatosilane.

The trifunctional silane can be exemplified by methyltrimethoxysilane, methyltriethoxysilane, methyldiethoxymethoxysilane, methylethoxydimethoxysilane, methyltrichlorosilane, methylmethoxydichlorosilane, methylethoxydichlorosilane, methyldimethoxychlorosilane, methylmethoxyethoxychlorosilane, methyldiethoxychlorosilane, methyltriacetoxysilane, methyldiacetoxymethoxysilane, methyldiacetoxyethoxysilane, methylacetoxydimethoxysilane, methylacetoxymethoxyethoxysilane, methylacetoxydiethoxysilane, methyltrihydroxysilane, methylmethoxydihydroxysilane, methylethoxydihydroxysilane, methyldimethoxyhydroxysilane, methylethoxymethoxyhydroxysilane, methyldiethoxyhydroxysilane, ethyltrimethoxysilane, ethyltriethoxysilane, ethyltrichlorosilane, ethyltriacetoxysilane, ethyltrihydroxysilane, propyltrimethoxysilane, propyltriethoxysilane, propyltrichlorosilane, propyltriacetoxysilane, propyltrihydroxysilane, butyltrimethoxysilane, butyltriethoxysilane, butyltrichlorosilane, butyltriacetoxysilane, butyltrihydroxysilane, hexyltrimethoxysilane, hexyltriethoxysilane, hexyltrichlorosilane, hexyltriacetoxysilane, hexyltrihydroxysilane, phenyltrimethoxysilane, phenyltriethoxysilane, phenyltrichlorosilane, phenyltriacetoxysilane, and phenyltrihydroxysilane.

The difunctional silane can be exemplified by di-tert-butyldichlorosilane, di-tert-butyldimethoxysilane, di-tert-butyldiethoxysilane, dibutyldichlorosilane, dibutyldimethoxysilane, dibutyldiethoxysilane, dichlorodecylmethylsilane, dimethoxydecylmethylsilane, diethoxydecylmethylsilane, dichlorodimethylsilane, dimethyldimethoxysilane, diethoxydimethylsilane, and diethyldimethoxysilane.

The monofunctional silane can be exemplified by t-butyldimethylchlorosilane, t-butyldimethylmethoxysilane, t-butyldimethylethoxysilane, t-butyldiphenylchlorosilane, t-butyldiphenylmethoxysilane, t-butyldiphenylethoxysilane, chlorodimethylphenylsilane, methoxydimethylphenylsilane, ethoxydimethylphenylsilane, chlorotrimethylsilane, trimethylmethoxysilane, ethoxytrimethylsilane, triethylmethoxysilane, triethylethoxysilane, tripropylmethoxysilane, tributylmethoxysilane, tripentylmethoxysilane, triphenylchlorosilane, triphenylmethoxysilane, and triphenylethoxysilane.

The volume-average diameter of the pores of the fine particle is preferably 7 nm to 20 nm. When the volume-average diameter of the pores is within the indicated range, moisture intake by the fine particle is impeded and charge stability in high-temperature, high-humidity environments is excellent. In addition, the mechanical strength of the fine particle is suitably maintained and the stability during durability testing is then excellent; in addition, color fluctuations in the image due to fluctuations in the toner laid-on level on the paper can be better suppressed.

Having the average pore diameter be at least 7 nm facilitates obtaining the effect of relaxing external forces received from, e.g., members. As a result, the effect of stability during durability testing is then even more readily obtained and color fluctuations in the image due to fluctuations in the toner laid-on level on the paper can be better suppressed. Having the average pore diameter be not more than 20 nm facilitates obtaining the effect of suppressing moisture intake by the fine particle and in addition improves the robustness of the fine particle and impedes the occurrence of crushing and breakage. Based on these considerations, the volume-average diameter of the pores is preferably 10 nm to 18 nm and more preferably 11 nm to 16 nm.

The volume-average diameter of the pores can be made larger by lowering the methanol ratio and by increasing the amount of catalyst. The volume-average diameter of the pores can be made smaller by doing the following in the condensation polymerization step: increasing the methanol ratio and reducing the amount of catalyst.

Designating X (m$^2$/g) as a theoretical BET specific surface area of the fine particle and Y (m$^2$/g) as a BET specific surface area measured for the fine particle using a multipoint BET method, X and Y preferably satisfy a following formula (2).

$$3.0 \leq Y/X \leq 8.0 \quad (2)$$

A fine particle that satisfies formula (2) is very porous and as a consequence can effectively improve the stability during durability testing against stresses and external forces received from, e.g., members. When Y/X is at least 3.0, there is a large number of pores in the fine particle, or the pore volume is large, and as a consequence the effect of stability during durability testing is obtained even more readily. When Y/X is not more than 8.0, the number of pores or the pore volume in the fine particle is then in a favorable range and the robustness of the fine particle is improved and crushing and breakage can be further suppressed. Y/X is preferably $4.0 \leq Y/X \leq 6.0$ based on the preceding considerations.

Y/X can be made larger by doing the following in the condensation polymerization step: lowering the reaction temperature and reducing the amount of catalyst. Y/X can be made smaller by doing the following in the condensation polymerization step: raising the reaction temperature, extending the reaction time, and increasing the amount of catalyst.

Y is preferably 75 to 300 m$^2$/g, more preferably 120 to 250 m$^2$/g, and even more preferably 150 to 200 m$^2$/g. X is preferably 20 to 60 m$^2$/g, more preferably 25 to 50 m$^2$/g, and even more preferably 30 to 40 m$^2$/g.

A number-average primary particle diameter of the fine particle must be 0.05 μm to 0.30 μm. Having the number-average primary particle diameter be in the indicated range facilitates the generation of a uniform coating of the fine particles on the toner particle. In addition, the charge-stabilizing effect is readily obtained because stresses on the toner can be suppressed.

When the high-volume output of a low-print-density image is carried out over an extended period of time in a severe environment such as a high-temperature, high-humidity environment, due to the large stresses on the toner, the external additive particle will be readily embedded in the toner surface when the number-average primary particle diameter of the fine particle is less than 0.05 μm. As a consequence, fluctuations in image color due to fluctuations in the toner laid-on level on the paper cannot be suppressed, the generation of fogging after use in durability testing is facilitated, and the charge stability is also reduced. Release of the fine particle from the toner surface is facilitated when the number-average primary particle diameter of the fine particle exceeds 0.30 μm. As a consequence, fluctuations in image color due to fluctuations in the toner laid-on level on the paper cannot be suppressed, the generation of fogging after use in durability testing is facilitated, and the charge stability is also reduced.

The number-average primary particle diameter of the fine particle is preferably 0.07 μm to 0.25 μm, more preferably 0.08 μm to 0.18 μm, and still more preferably 0.08 μm to 0.15 μm. The number-average primary particle diameter of the fine particle can be made larger by doing the following in the hydrolysis step: lowering the reaction temperature, shortening the reaction time, and increasing the amount of catalyst. The number-average primary particle diameter of the fine particle can be made smaller by doing the following in the hydrolysis step: raising the reaction temperature, extending the reaction time, and reducing the amount of catalyst.

Designating, in x-ray photoelectron spectroscopic measurement of a surface of the fine particle, dSi as an element concentration of a silicon element, dO as an element concentration of an oxygen atom, dC as an element concentration of a carbon atom, and designating their total to be 100.0 atomic %, dC is preferably 10.0 atomic % to 50.0 atomic %, more preferably 20.0 atomic % to 45.0 atomic %, and even more preferably 25.0 atomic % to 40.0 atomic %. Having dC be in the indicated range is preferred from the standpoints of the stability during durability testing and charge stability in high-temperature, high-humidity environments.

When dC is at least 10.0 atomic %, the amount of alkyl at the fine particle surface is then sufficient and the charge stability in high-temperature, high-humidity environments is further improved. In addition, when dC is not more than 50.0 atomic %, the amount of alkyl at the fine particle surface is then favorable and as a consequence the suppressing effect on external stresses is improved and the stability during durability testing is made even better.

A Young's modulus of the fine particle is preferably 1,500 MPa to 30,000 MPa. By having the Young's modulus be in the indicated range, the stress can be relaxed when the toner is subjected to stress from members, e.g., the carrier, and embedding of the external additive particle in the toner particle surface can be better suppressed.

When the Young's modulus is at least 1,500 MPa, breakage of the fine particle itself can be suppressed when the toner is subjected to stress from members, e.g., the carrier. When the Young's modulus is not more than 30,000 MPa, this facilitates stress relaxation when the toner is subjected to stresses from members, e.g., the carrier, and embedding of the fine particle in the toner particle surface can be better suppressed. As a consequence, alterations in the state of the toner surface are impeded and toner charging variations can be better suppressed.

The Young's modulus of the fine particle is more preferably 3,000 MPa to 9,000 MPa and is even more preferably 5,000 MPa to 7,000 MPa. The Young's modulus of the fine particle can be adjusted by changing the mixing ratio for the aforementioned monomers, the conditions during hydrolysis and condensation, the pH, and the type of catalyst.

The surface of the fine particle preferably is subjected to a surface treatment with a hydrophobic treatment agent. That is, the fine particle is preferably a silicon polymer particle that has been subjected to a surface treatment with a hydrophobic treatment agent. There are no particular limitations on the hydrophobic treatment agent, but organosilicon compounds are preferred.

The hydrophobizing agent can be exemplified by an alkylsilazane compound such as hexamethyldisilazane, an alkylalkoxysilane compound such as diethyldiethoxysilane, trimethylmethoxysilane, methyltrimethoxysilane, butyltrimethoxysilane, and dodecyltrimethoxysilane, a fluoroalkylsilane compound such as trifluoropropyltrimethoxysilane, a chlorosilane compound such as dimethyldichlorosilane and trimethylchlorosilane, a siloxane compound such as octamethylcyclotetrasiloxane, a silicone oil, a silicone varnish, and the like.

Changes in the toner charge quantity in high-temperature, high-humidity environments can be further suppressed by subjecting the fine particle surface to a hydrophobic treatment. Within this sphere, the fine particle is preferably subjected to a surface treatment with at least one compound selected from the group consisting of alkylsilazane compounds, alkylalkoxysilane compounds, chlorosilane compounds, fluoroalkylsilane compounds, siloxane compounds, and silicone oils. From the standpoint of the charge stability in high-temperature, high-humidity environments, the fine particle is more preferably subjected to a surface treatment with an alkylsilazane compound.

Viewed in terms of the charge stability in high-temperature, high-humidity environments, a hydrophobicity of the fine particle according to a methanol titration method is preferably 30 volume % to 65 volume %, more preferably 50 volume % to 60 volume %, and still more preferably 53 volume % to 58 volume %.

Designating, with reference to the chart obtained by $^{29}$Si-NMR measurement of the fine particle, SA as a total peak area corresponding to a silicon polymer, S4 as a peak area corresponding to a Q unit structure, S3 as a peak area corresponding to a T unit structure, and S2 as a peak area corresponding to a D unit structure, SA, S4, S3, and S2 preferably satisfy the following formulas (I), (II), and (III).

$$0.20 \leq S4/SA \leq 0.60 \quad \text{(I)}$$

$$0 \leq S3/SA \leq 0.50 \quad \text{(II)}$$

$$0.20 \leq S2/SA \leq 0.70 \quad \text{(III)}$$

Within the indicated ranges, when the toner is subjected to stresses from a member such as the carrier, embedding of the fine particle in the toner particle surface is better suppressed and breakage of the fine particle itself is better suppressed. $0.30 \leq S4/SA \leq 0.50$ is more preferred and $0.34 \leq S4/SA \leq 0.40$ is still more preferred.

In addition, $0 \leq S3/SA \leq 0.40$ is more preferred, $0 \leq S3/SA \leq 0.20$ is still more preferred, $0 \leq S3/SA \leq 0.10$ is even more preferred, and $0 \leq S3/SA \leq 0.05$ is particularly preferred.

$0.50 \leq S2/SA \leq 0.70$ is more preferred and $0.60 \leq S2/SA \leq 0.66$ is still more preferred. The amount of occurrence of Si—R$^1$ in the fine particle assumes an optimal level when the indicated ranges are obeyed, which is thus more preferred from the standpoints of the environmental stability of the toner, charge stability of the toner, and stability of the toner during durability testing.

An average circularity of the fine particle is preferably 0.85 to 0.95 from the standpoints of the charge stability of the toner and the stability of the toner during durability testing. 0.88 to 0.93 is more preferred. The average circularity of the fine particle can be made larger by doing the following in the condensation polymerization step: raising the reaction temperature and extending the reaction time. The average circularity of the fine particle can be made lower by doing the following in the condensation polymerization step: lowering the reaction temperature and shortening the reaction time.

An external additive for a toner preferably comprises the fine particle that has been described in the preceding. In addition, the toner comprises a toner particle and an external additive for a toner, wherein the toner particle comprises a binder resin and the external additive for the toner is the fine particle that has been described in the preceding. From the standpoint of charge stability, the content in the toner of the external additive for the toner is preferably 0.1 mass parts to 20.0 mass parts per 100 mass parts of the toner particle. 0.2 mass parts to 18.0 mass parts is more preferred, 0.5 mass parts to 15.0 mass parts is still more preferred, and 1.0 mass parts to 10.0 mass parts is even more preferred.

When the content of the external additive for the toner is at least 0.1 mass parts, the stress applied to the toner can be suppressed and the stability during durability testing and the charge stability can be further improved—even when the high-volume output of a low-print-density image is carried out over an extended period of time in a severe environment such as a high-temperature, high-humidity environment. In addition, when the content of the external additive for the toner is not more than 20.0 mass parts, filming by the external additive particles at the carrier or photosensitive member can be suppressed even in the case of the extended output of a high-print-density image.

Binder Resin

The binder resin used in the toner is not particularly limited, and for instance the following polymers can be used. For example, monopolymers of styrene and substituted styrene, such as polystyrene, poly-p-chlorostyrene and polyvinyltoluene; styrene copolymers such as styrene-p-chlorostyrene copolymer, styrene-vinyltoluene copolymer, styrene-vinylnaphthalene copolymer, styrene-acrylate ester copolymers, styrene-methacrylate ester copolymers, styrene-α-chloromethyl methacrylate copolymer, styrene-acrylonitrile copolymer, styrene-vinyl methyl ether copolymer, styrene-vinyl ethyl ether copolymer, styrene-vinyl methyl ketone copolymer and styrene-acrylonitrile-indene copolymer; and polyvinyl chloride, phenol resin, natural resin-modified phenol resin, natural resin-modified maleic acid resin, acrylic resin, methacrylic resin, polyvinyl acetate, silicone resin, polyester resin, polyurethane resin, polyamide resin, furan resin, epoxy resin, xylene resin, polyvinylbutyral resin, terpene resin, coumarone-indene resin and petroleum-based resin may be used. Preferred among the foregoing are polyester resins, from the viewpoint of durability stability and charging stability.

From the standpoints of environmental stability and charge stability, the acid value of the polyester resin is preferably 0.5 mg KOH/g to 40 mg KOH/g. The functional groups in polyester resin that generate its acid value interact with the Si—R$^1$ in the external additive, and further improvements in the durability and the toner charging performance in high-temperature, high-humidity environments can be brought about as a result. The acid value is more preferably 1 mg KOH/g to 20 mg KOH/g and still more preferably 1 mg KOH/g to 15 mg KOH/g.

Colorant

A colorant may be used in the toner particle. The colorant may also be contained in the toner particle. The following are examples of colorants. Examples of black colorants include carbon black, and blacks obtained by color adjustment of blending yellow, magenta and cyan colorants. A pigment may be used alone as the colorant, but from the standpoint of image quality with full-color images, preferably a dye and a pigment are used together to improve the color clarity.

Examples of magenta pigments include C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269 and 282; C.I. Pigment Violet 19; and C.I. Vat Red 1, 2, 10, 13, 15, 23, 29 and 35.

Examples of magenta dyes include C.I. Solvent Red 1, 3, 8, 23, 24, 25, 27, 30, 49, 81, 82, 83, 84, 100, 109 and 121; C.I. Disperse Red 9; C.I. Solvent Violet 8, 13, 14, 21 and 27; oil-soluble dyes such as C.I. Disperse Violet 1; and basic dyes such as C.I. Basic Red 1, 2, 9, 12, 13, 14, 15, 17, 18, 22, 23, 24, 27, 29, 32, 34, 35, 36, 37, 38, 39 and 40 and C.I. Basic Violet 1, 3, 7, 10, 14, 15, 21, 25, 26, 27 and 28.

Examples of cyan pigments include C.I. Pigment Blue 2, 3, 15:2, 15:3, 15:4, 16 and 17; C.I. Vat Blue 6; C.I. Acid Blue 45, and copper phthalocyanine pigments having 1 to 5 phthalimidomethyl groups substituted on a phthalocyanine skeleton. Examples of cyan dyes include C.I. Solvent Blue 70.

Examples of yellow pigments include C.I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181 and 185; and C.I. Vat Yellow 1, 3, and 20. Examples of yellow dyes include C.I. Solvent Yellow 162. The content of the colorant is preferably from 0.1 to 30 mass parts per 100 mass parts of the binder resin.

Wax

Wax may be used in the toner particle. Examples of waxes include the following. Examples of the wax include the following: hydrocarbon waxes such as low molecular weight polyethylene, low molecular weight polypropylene, alkylene copolymer, microcrystalline wax, paraffin wax and Fischer-Tropsch wax; hydrocarbon wax oxides such as polyethylene oxide wax, and block copolymers of these; waxes consisting primarily of fatty acid esters, such as carnauba wax; and partially or fully deoxidized fatty acid esters, such as deoxidized carnauba wax.

Other examples include the following: saturated linear fatty acids such as palmitic acid, stearic acid and montanic acid; unsaturated fatty acids such as brassidic acid, eleostearic acid and parinaric acid; saturated alcohols such as stearyl alcohol, aralkyl alcohol, behenyl alcohol, carnaubyl alcohol, seryl alcohol and melissyl alcohol; polyvalent alcohols such as sorbitol; esters of fatty acids such as palmitic acid, stearic acid, behenic acid and montanic acid with alcohols such as stearyl alcohol, aralkyl alcohol, behenyl alcohol, carnaubyl alcohol, seryl alcohol and mellisyl alcohol; fatty acid amides such as linoleamide, oleamide and lauramide; saturated fatty acid bisamides such as methylenebis stearamide, ethylenebis capramide, ethylenebis lauramide and hexamethylenebis stearamide; unsaturated fatty acid amides such as ethylenebis oleamide, hexamethylenebis oleamide, N,N'-dioleyladipamide and N,N'-dioleylsebacamide; aromatic bisamides such as m-xylenebis stearamide and N,N'-distearylisophthalamide; fatty acid metal salts (commonly called metal soaps) such as calcium stearate, calcium laurate, zinc stearate and magnesium stearate; aliphatic hydrocarbon waxes grafted with vinyl monomers such as styrene or acrylic acid; partially esterified products of fatty acids and polyvalent alcohols, such as behenic acid monoglyceride; and methyl ester compounds with hydroxyl groups obtained by hydrogenation of plant-based oils and fats. The content of the wax is preferably from 2.0 parts by mass to 30.0 parts by mass, relative to 100 parts by mass of the binder resin.

Charge Control Agent

The toner particle may comprises a charge control agent as necessary. A known charge control agent may be used, but a metal compound of an aromatic carboxylic acid is especially desirable because it is colorless and yields a toner particle that has a rapid charging speed and can stably maintain a fixed charge quantity.

Examples of negatively-charging charge control agents include salicylic acid metal compounds, naphthoic acid metal compounds, dicarboxylic acid metal compounds, polymeric compounds having sulfonic acids or carboxylic acids in the side chains, polymeric compounds having sulfonic acid salts or sulfonic acid esters in the side chains, polymeric compounds having carboxylic acid salts or carboxylic acid esters in the side chains, and boron compounds, urea compounds, silicon compounds and calixarenes.

Examples of the positive charge control agent include a quaternary ammonium salt, a polymer compound having the quaternary ammonium salt in a side chain, a guanidine compound, and an imidazole compound. The charge control agent may be added internally or externally to the toner particle. The amount of the charge control agent added is preferably from 0.2 parts by mass to 10 parts by mass with respect to 100 parts by mass of the binder resin.

<Inorganic Fine Particles>

The toner may include, if necessary, other inorganic fine particles in addition to the above-mentioned external additive for toner. The inorganic fine particles may be internally added to the toner particle, or may be mixed with the toner particle as an external additive. When contained as an external additive, inorganic fine particles such as silica fine particles, titanium oxide fine particles, and aluminum oxide fine particles are preferable. The inorganic fine particles are preferably hydrophobized with a hydrophobizing agent such as a silane compound, a silicone oil or a mixture thereof.

As the external additive for improving the flowability, inorganic fine particles having a specific surface area of from 50 $m^2/g$ to 400 $m^2/g$ or less are preferable. Inorganic fine particles having a specific surface area in the above range may be used in combination with an external additive for toner in order to achieve both improvement in flowability and stabilization of durability.

The inorganic fine particles are preferably used in an amount of from 0.1 parts by mass to 10.0 parts by mass with respect to 100 parts by mass of the toner particle. When the above range is satisfied, the effect of charge stability can be easily obtained. The content of the above-mentioned external additive for toner is preferably from 50% by mass to 100% by mass, more preferably from 80% by mass to 100% by mass, and still more preferably from 90% by mass to 100% by mass, based on the total amount of the external additive.

<Developer>

A toner can be used as a one-component developer, but it can also be mixed with a magnetic carrier and used as a two-component developer in order to further improve dot reproducibility and to supply a stable image for a long time. That is, in a two-component developer containing a toner and a magnetic carrier, the toner is preferably the above-mentioned toner.

Generally well-known substances such as, for example, iron oxide, unoxidized iron powder; metal particles such as particles of iron, lithium, calcium, magnesium, nickel, copper, zinc, cobalt, manganese, chromium, and rare earths, particles of alloys thereof, and particles of oxides thereof; a magnetic substance such as a ferrite; a magnetic substance-dispersed resin carrier (so-called resin carrier) including the magnetic substance and a binder resin that holds the magnetic substance in a dispersed state can be used as the magnetic carrier. The mixing ratio of the magnetic carrier and the toner is preferably such that the toner concentration in the two-component developer is from 2% by mass to 15% by mass, and more preferably from 4% by mass to 13% by mass.

Method for Producing a Toner Particle

The method for producing the toner particle is not particularly limited, and a known production method such as suspension polymerization, emulsification aggregation, melt-kneading or dissolution suspension can be resorted to. A toner can then be obtained by mixing the above toner external additive, and other external additives as needed, with the obtained toner particle.

Mixing of the toner particle and the external additive can be accomplished using a mixing device such as a double-cone mixer, a V-type mixer, a drum-type mixer, a super mixer, a Henschel mixer, a Nauta mixer, Mechano Hybrid (by Nippon Coke & Engineering Co., Ltd.) or Nobilta (by Hosokawa Micron Corporation).

The measurement methods for various physical properties will be explained below.

<Separation of Fine Particles (External Additives for Toners) and Toner Particles from Toner>

It is also possible to measure each physical property by using the fine particle separated from the toner by using the following method. A total of 200 g of sucrose (manufactured by Kishida Chemical Co., Ltd.) is added to 100 mL of ion-exchanged water and dissolved in a hot water bath to prepare a sucrose concentrate. A total of 31 g of the sucrose concentrate and 6 mL of Contaminone N (a 10% by mass aqueous solution of a neutral detergent for cleaning precision measuring instruments; has pH 7 and includes a non-ionic surfactant, an anionic surfactant, and an organic builder; manufactured by Wako Pure Chemical Industries, Ltd.) are placed in a centrifuge tube to prepare a dispersion liquid. A total of 1 g of toner is added to the dispersion liquid, and the toner lumps are loosened with a spatula or the like.

The centrifuge tube is shaken with a shaker ("KM Shaker" (model: V.SX), manufactured by Iwaki Sangyo Co., Ltd.) for 20 min under the condition of 350 reciprocations per minute. After shaking, the solution is transferred to a glass tube for a swing rotor (50 mL), and centrifugation is performed at 3500 rpm for 30 min with a centrifuge.

In the glass tube after centrifugation, the toner particle is present in the uppermost layer, and the fine particle is present on the aqueous solution side of the lower layer. The aqueous solution of the lower layer is collected and centrifuged to separate the sucrose and the fine particle, and the fine particle is collected. If necessary, centrifugation is repeated, and after sufficient separation, the dispersion liquid is dried and a fine particle is collected.

When a plurality of fine particles are added, the fine particles can be sorted by using a centrifugation method or the like.

<Method for Measuring Number-Average Particle Diameter of Primary Particles of Fine Particles>

The number-average particle diameter of primary particles of fine particle can be measured in accordance with a centrifugal sedimentation method. Specifically, 0.01 g of dried fine particles are placed in a 25 ml glass vial, and 0.2 g of a 5% Triton solution and 19.8 g of RO water are added thereto, to produce a solution. Next, the probe (the tip within the leading end) of an ultrasonic disperser is immersed in that solution, to elicit ultrasonic dispersion at an output of 20 W for 15 minutes, and obtain a dispersion as a result. The number-average particle diameter of primary particles is measured next, using this dispersion, with the help of a centrifugal sedimentation particle size distribution measuring device DC24000 by CPS Instruments Inc. Disc rotational speed is set to 18000 rpm, and true density is set to 1.3 $g/cm^3$. Prior to measurement, the device is calibrated using polyvinyl chloride particles having an average particle diameter of 0.476 μm.

<Method for Measuring Acid Value of Resin such as a Binder Resin>

The acid value is the number of mg of potassium hydroxide required to neutralize acid components such as free fatty acids and resin acids contained in 1 g of a sample. The acid value is measured in the following manner according to JIS-K0070-1992.

(1) Reagent

A total of 1.0 g of phenolphthalein is dissolved in 90 mL of ethyl alcohol (95% by volume) and ion-exchanged water is added to make 100 mL and obtain a phenolphthalein solution.

A total of 7 g of special grade potassium hydroxide is dissolved in 5 mL of water and ethyl alcohol (95% by volume) is added to make 1 L. The solution is put in an alkali-resistant container so as to avoid contact with carbon dioxide, allowed to stay for 3 days, and then filtered to obtain a potassium hydroxide solution. The obtained potassium hydroxide solution is stored in an alkali-resistant container. A total of 25 mL of 0.1 mol/L hydrochloric acid is placed in a triangular flask, a few drops of the phenolphthalein solution are added, titration is performed with the potassium hydroxide solution, and a factor of the potassium hydroxide solution is obtained from the amount of the potassium hydroxide solution required for neutralization. The 0.1 mol/L hydrochloric acid used is prepared according to JIS K 8001-1998.

(2) Operation (A) Main Test

A total of 2.0 g of the crushed sample is accurately weighed into a 200 mL Erlenmeyer flask, 100 mL of a mixed solution of toluene/ethanol (2:1) is added, and dissolution is performed over 5 h. Then, a few drops of the phenolphthalein solution are added as an indicator, and titration is performed using the potassium hydroxide solution. The end point of the titration is when the light red color of the indicator continues for about 30 sec.

(B) Blank Test

The same titration as in the above operation is performed, except that no sample is used (that is, only a mixed solution of toluene/ethanol (2:1) is used).

(3) The Obtained Result is Substituted into the Following Formula to Calculate the Acid Value.

$$A=[(C-B) \times f \times 5.61]/S$$

Here, A: acid value (mg KOH/g), B: addition amount of potassium hydroxide solution in the blank test (mL), C: addition amount of potassium hydroxide solution in the main test (mL), f: potassium hydroxide solution factor, and S: mass (g) of the sample.

<Measurement of Acid Value of Polyester Resin from Toner>

The following method can be used for measuring the acid value of the polyester resin in the toner. The polyester resin is separated from the toner by the following method, and the acid value is measured. The toner is dissolved in tetrahydrofuran (THF), and the solvent is distilled off under reduced pressure from the obtained soluble fraction to obtain a tetrahydrofuran (THF)-soluble component of the toner. The obtained tetrahydrofuran (THF)-soluble component of the toner is dissolved in chloroform to prepare a sample solution having a concentration of 25 mg/ml. A total of 3.5 ml of the obtained sample solution is injected into the following apparatus, and the component with a molecular weight of 2000 or more is separated as a resin component under the following conditions.

Preparative GPC equipment: preparative HPLC LC-980 manufactured by Nippon Analytical Industry Co., Ltd.
Sorting columns: JAIGEL 3H, JAIGEL 5H (manufactured by Nippon Analytical Industry Co., Ltd.)
Eluent: chloroform
Flow velocity: 3.5 ml/min After separating the high-molecular-weight component derived from the resin, the solvent is distilled off under reduced pressure, followed by drying in an atmosphere of 90° C. under reduced pressure for 24 h. The above operation is repeated until about 2.0 g of the resin component is obtained. Using the obtained sample, the acid value is measured according to the above procedure.

Method for Measuring the Weight-Average Particle Diameter (D4) of the Toner Particle The weight-average particle diameter (D4) of the toner particle is determined by carrying out the measurements in 25,000 channels for the number of effective measurement channels and performing analysis of the measurement data, using a "Coulter Counter Multisizer 3" (registered trademark, Beckman Coulter, Inc.), a precision particle size distribution measurement instrument operating on the pore electrical resistance method and equipped with a 100-μm aperture tube, and using the accompanying dedicated software, i.e., "Beckman Coulter Multisizer 3 Version 3.51" (Beckman Coulter, Inc.), to set the measurement conditions and analyze the measurement data.

The aqueous electrolyte solution used for the measurements is prepared by dissolving special-grade sodium chloride in deionized water to provide a concentration of approximately 1 mass % and, for example, "ISOTON II" (Beckman Coulter, Inc.) can be used. The dedicated software is configured as follows prior to measurement and analysis.

In the "modify the standard operating method (SOM)" screen in the dedicated software, the total count number in the control mode is set to 50000 particles; the number of measurements is set to 1 time; and the Kd value is set to the value obtained using "standard particle 10.0 μm" (Beckman Coulter, Inc.). The threshold value and noise level are automatically set by pressing the threshold value/noise level measurement button. In addition, the current is set to 1,600 μA; the gain is set to 2; the electrolyte solution is set to ISOTON II; and a check is entered for the post-measurement aperture tube flush. In the "setting conversion from pulses to particle diameter" screen of the dedicated software, the bin interval is set to logarithmic particle diameter; the particle diameter bin is set to 256 particle diameter bins; and the particle diameter range is set to from 2 μm to 60 μm. The specific measurement procedure is as follows.

(1) Approximately 200 mL of the above-described aqueous electrolyte solution is introduced into a 250-mL roundbottom glass beaker intended for use with the Multisizer 3 and this is placed in the sample stand and counterclockwise stirring with the stirrer rod is carried out at 24 rotations per second. Contamination and air bubbles within the aperture tube are preliminarily removed by the "aperture tube flush" function of the dedicated software.

(2) Approximately 30 mL of the aqueous electrolyte solution is introduced into a 100-mL flatbottom glass beaker. To this is added approximately 0.3 mL of the dilution prepared by the three-fold (mass) dilution with deionized water of "Contaminon N" (a 10 mass % aqueous solution of a neutral pH 7 detergent for cleaning precision measurement instrumentation, comprising a nonionic surfactant, anionic surfactant, and organic builder, from Wako Pure Chemical Industries, Ltd.) as a dispersing agent.

(3) A prescribed amount of deionized water is introduced into the water tank of the ultrasound disperser "Ultrasonic Dispersion System Tetora 150" (Nikkaki Bios Co., Ltd.), which has an electrical output of 120 W and is equipped with two oscillators (oscillation frequency=50 kHz) disposed such that the phases are displaced by 180°, and approximately 2 mL of Contaminon N is added to this water tank.

(4) The beaker described in (2) is set into the beaker holder opening on the ultrasound disperser and the ultrasound disperser is started. The vertical position of the beaker is adjusted in such a manner that the resonance condition of the surface of the aqueous electrolyte solution within the beaker is at a maximum.

(5) While the aqueous electrolyte solution within the beaker set up according to (4) is being irradiated with ultrasound, approximately 10 mg of the toner particle is added to the aqueous electrolyte solution in small aliquots and dispersion is carried out. The ultrasound dispersion treatment is continued for an additional 60 seconds. The water temperature in the water tank is controlled as appropriate during ultrasound dispersion to be from 10° C. to 40° C.

(6) Using a pipette, the dispersed toner-containing aqueous electrolyte solution prepared in (5) is dripped into the roundbottom beaker set in the sample stand as described in (1) with adjustment to provide a measurement concentration of approximately 5%. Measurement is then performed until the number of measured particles reaches 50000.

(7) The measurement data is analyzed by the dedicated software provided with the instrument and the weight-average particle diameter (D4) is calculated. When set to graph/volume % with the dedicated software, the "average diameter" on the analysis/volume statistical value (arithmetic average) screen is the weight-average particle diameter (D4).

<Method for Measuring Average Circularity of Fine Particles>

The average circularity is used as a simple method for quantitatively representing the shape of particles. Particles in the range of from 0.01 μm to 400 μm in equivalent circle diameter are measured using a flow-type particle image analyzer FPIA-3000 manufactured by Sysmex Corporation, the circularity of the measured particles is determined by the following formula, and the value obtained by dividing the total circularity by the total number of particles is defined as the average circularity. The number of particles to be measured is 5000.

Circularity $a = L0/L$ (in the formula, L0 indicates the peripheral length of a circle having the same projected area as the particle image, and L indicates the peripheral length of the particle projected image when image processing is performed at an image processing resolution of 512× 512 (pixels of 0.3 μm×0.3 μm)).

Method for Measuring the Young's Modulus of the Fine Particle

The Young's modulus of the fine particle is acquired using a microcompression tester using a Hysitron PI 85L PicoIndenter (Bruker). The Young's modulus (MPa) is calculated from the slope of the profile (load-displacement curve) for the displacement (nm) yielded by the measurement and the test force (μN).

Instrumentation and Tools
　　base system: Hysitron PI-85L
　　measurement indenter: 1 μm flat end indenter
　　SEM used: Thermo Fisher Versa 3D
　　SEM conditions: −10° tilt, 13 pA at 10 keV Measurement Conditions
　　measurement mode: displacement control
　　maximum displacement: 30 nm
　　displacement rate: 1 nm/sec
　　hold time: 2 seconds
　　unloading rate: 5 nm/sec Analytic Method The Young's modulus of the fine particle is calculated by applying Hertz analysis to the curve for a 0 nm to 10 nm compression in the obtained load-displacement curve.

Sample Preparation

The fine particle is attached to a silicon wafer.

Method for Measuring the Constituent Compound Occurrence Ratio and B/A for the Fine Particle Using Solid-State $^{29}$Si-NMR In solid-state $^{29}$Si-NMR, peaks are detected in different shift regions depending on the structure of the functional group bonded to the Si in the constituent compounds of the fine particle. The structures bonded to Si can be identified by identifying each peak position using a reference sample. In addition, the occurrence ratio of each constituent compound can be calculated from the obtained peak areas. This can be sought by calculation of the proportion of the peak area for the Q unit structure, T unit structure, and D unit structure, with respect to the total peak area.

Specifically, the measurement conditions for solid-state $^{29}$Si-NMR are as follows.
　　Equipment: JNM-ECX5002 (JEOL RESONANCE)
　　Temperature: room temperature
　　Measurement method: DDMAS method $^{29}$Si 45°
　　Sample tube: zirconia, 3.2 mm in diameter
　　Sample: filled in powder form in the sample tube
　　Sample rotation speed: 10 kHz
　　Relaxation delay: 180 s
　　Scan: 2000

After the measurement, peak separation into the following M unit structure, D unit structure, T unit structure, and Q unit structure is performed for the sample by curve fitting multiple silane components having different substituents and bonding groups, and the respective peak areas are calculated.

M unit structure: $(Ra)(Rb)(Rc)SiO_{1/2}$　　(S1)

D unit structure: $(Rd)(Re)Si(O_{1/2})_2$　　(S2)

T unit structure: $Rf\ Si(O_{1/2})_3$　　(S3)

Q unit structure: $Si(O_{1/2})_4$　　(S4)

wherein (S1+S2+S3+S4)=SA

The Ra, Rb, Rc, Rd, Re, and Rf in formulas (S1), (S2), and (S3) represent Si-bonded organic groups, e.g., $C_{1-6}$ hydrocarbon groups (for example, alkyl groups), or halogen atoms. When a more detailed structural confirmation is necessary, identification may be performed by combining the results of the $^{29}$Si-NMR measurement with the results from $^{13}$C-NMR measurement and $^1$H-NMR measurement. S2/SA, S3/SA, and S4/SA are calculated from the thusly determined SA, S2, S3, and S4.

Method for Calculating B/A

The (Si—$R^1$) peak area for each unit structure at the positions indicated below is calculated from the chart yielded by solid-state $^{29}$Si-NMR. $R^1$ represents a $C_{1-6}$ alkyl group, as described above.

The peak area of the (Si—$R^1$)-containing Q4 unit structure is designated S44; the peak area of the (Si—$R^1$)-containing Q3 unit structure is designated S43; the peak area of the (Si—$R^1$)-containing Q2 unit structure is designated S42; and the peak area of the (Si—$R^1$)-containing Q1 unit structure is designated S41.

The peak area of the (Si—$R^1$)-containing T3 unit structure is designated S33; the peak area of the (Si—$R^1$)-containing T2 unit structure is designated S32; and the peak area of the (Si—$R^1$)-containing T1 unit structure is designated S31.

The peak area of the D2 unit structure containing one (Si—$R^1$) is designated S22A; the peak area of the D2 unit structure containing two (Si—$R^1$) is designated S22B; the peak area of the D1 unit structure containing one (Si—$R^1$) is designated S21A; and the peak area of the D1 unit structure containing two (Si—$R^1$) is designated S21B.

The peak area of the M1 unit structure containing one (Si—$R^1$) is designated S11A; the peak area of the M1 unit structure containing two (Si—$R^1$) is designated S11B; and the peak area of the M1 unit structure containing three (Si—$R^1$) is designated S11C.

Using these designations, the peak area proportion for Si—$R^1$ for each unit structure is calculated as follows.

QB, i.e., the peak area proportion for Si—$R^1$ corresponding to the Q unit structure,=(S44/S4)×0+(S43/S4)×0+(S42/S4)×0+(S41/S4)×0

TB, i.e., the peak area proportion for Si—$R^1$ corresponding to the T unit structure,=(S33/S3)×¼+(S32/S3)×¼+(S31/S3)×¼

DB, i.e., the peak area proportion for Si—$R^1$ corresponding to the D unit structure,=(S22A/S2)×¼+(S22B/S2)×½+(S21A/S2)×¼+(S21B/S2)×½

MB, i.e., the peak area proportion for Si—$R^1$ corresponding to the M unit structure,=(S11A/S1)×¼+(S11B/S1)×½+(S11C/S1)×¾

The structural units in a silicon polymer are classified, in accordance with the number of functional groups, into the M unit (monofunctional), D unit (difunctional), T unit (trifunctional), and Q unit (tetrafunctional). Moreover, in the present disclosure, differences in the degree of condensation are classified for each unit into, e.g., the D1 unit, D2 unit, T1 unit, T2 unit, T3 unit, and so forth, depending on the number of crosslinking oxygens. That is, the number appended to the alphabetic designation, e.g., D or T, represents the number of siloxane bond-forming crosslinking oxygens. For example, the T3 unit indicates that the three functional groups are all condensed and participating in siloxane bonds. The T2 unit indicates that two of the three functional groups are condensed and participating in siloxane bonds while one functional group is not condensed.

Q Unit Structure
  Q4: −105 ppm to −115 ppm
  Q3: −95 ppm to −104 ppm
  Q2: −85 ppm to −94 ppm
  Q1: −75 ppm to −84 ppm
T Unit Structure
  T3: −60 ppm to −70 ppm
  T2: −50 ppm to −59 ppm
  T1: −40 ppm to −49 ppm
D Unit Structure
  D2: −15 ppm to −25 ppm
  D1: −10 ppm to −14 ppm
M unit structure
  M1: −5 ppm to −9 ppm B/A=QB×S4/SA+TB×S3/SA+DB×S2/SA+MB×S1/SA is calculated using the aforementioned formulas.

Method for Measuring the Hydrophobicity of the Fine Particle

The hydrophobicity of the fine particle is calculated using the methanol titration method. The specific measurement procedure is as follows. A mixture is prepared by adding 0.5 g of the external additive particles for toners to 50 mL of RO water, and methanol is dripped from a burette into this mixture while stirring same until the entire amount of the external additive particles for toners is wetted. Whether the entire amount has been wetted is evaluated by whether all the fine particles floating on the water surface have sunk into the liquid and are suspended in the liquid. At this point, the hydrophobicity is taken to be the value of the percentage (volume basis) for the methanol with respect to the total amount of the added methanol and the mixture at the point of completion of the dropwise addition. A higher value for the hydrophobicity indicates a more hydrophobic character.

<Method for Measuring the Surface Treatment Agent for the Fine Particle>

The surface treatment agent for the fine particle is analyzed by pyrolysis-GC-MS (gas chromatography–mass spectrometry). Specifically, the measurement conditions are as follows.

Equipment: GC6890A (manufactured by Agilent Technologies, Inc.), pyrolyzer (manufactured by Japan Analytical Industry Co., Ltd.)
Column: HP-5 ms 30 m
Pyrolysis temperature: 590° C.

By specifying each peak position of the profile obtained by the measurement using a standard sample, the surface treatment agent for the fine particle is specified.

Method for Measuring the Volume-Average Diameter of the Pores and the Total Pore Volume for the Fine Particle Using a Tristar 3000 (Shimadzu Corporation) pore size distribution analyzer, the volume-average pore diameter and the total pore volume are measured on the fine particle by a gas adsorption method in which nitrogen gas is adsorbed to the sample surface. The measurement method is carried out in accordance with the operating manual provided by Shimadzu Corporation.

0.5 g of the sample is first introduced into the sample tube and a vacuum is applied for 24 hours at 100° C. After application of the vacuum has been completed, the sample weight is exactly weighed to yield the sample. The total pore volume in the pore diameter range from 1.7 nm to 300.0 nm and the volume-average pore diameter can be determined by the BJH method using the resulting sample and the aforementioned pore size distribution analyzer. The value of the true density measured using an AccuPyc 1330 dry pycnometer (Shimadzu Corporation) is used for the density required for the measurement.

Measurement of the BET Specific Surface Area of the Fine Particle

The BET specific surface area Y can be determined according to the BET method (specifically the BET multipoint method) using a cryogenic gas adsorption procedure based on a dynamic constant pressure procedure. Using a specific surface area analyzer (product name: Gemini 2375 Ver. 5.0, Shimadzu Corporation), the BET specific surface area Y ($m^2$/g) can be calculated by measurement carried out using the BET multipoint method and adsorption of nitrogen gas to the sample surface. In the following formula, a unit of "average circle-equivalent diameter" is "m".

In addition, the theoretical BET specific surface area X ($m^2$/g) is calculated using the following formula assuming the fine particle to be a true sphere.

theoretical BET specific surface area $X=(4\times\pi\times(\text{"average circle-equivalent diameter } A\text{"}/2)^2)/(4/3\times\pi\times(\text{"average circle-equivalent diameter } A\text{"}/2)^3/\times\text{density})\times 1000000$ The value of the true density measured using an AccuPyc 1330 dry pycnometer (Shimadzu Corporation) is used for the density (g/$cm^3$) required for the calculation. In addition, the value obtained from measurement as described above of the number-average primary particle diameter of the fine particle is used for the average circle-equivalent diameter A of the fine particle.

Method for Measuring the Element Concentration dC for the Carbon Atom in the Fine Particle The ratios for the elements present in the fine particle are measured using XPS. The concentration dC is calculated when designating dSi as the measured element concentration of the silicon element, dO as the element concentration of the oxygen atom, and dC as the element concentration of the carbon atom, and designating their total to be 100.0 atomic %. The XPS measurement conditions are given below.
 instrument used: PHI 5000 VersaProbe II, Ulvac-Phi, Inc.
 irradiated radiation: Al-Kα radiation
 beam diameter: 100 µm
 output: 25 W, 15 kV
 photoelectron extraction angle: 45°
 pass energy: 58.70 eV
 step size: 0.125 eV
 XPS peaks: C 2p, O 2p, Si 2p
 measurement range: 300 µm×200 µm
 gun type: GCIB
 time: 15 min
 interval: 1 min
 sputter setting: 20 kV
The sample is set in the 2 mmø, 2 mm-deep sample set hole machined into the XPS platen.

EXAMPLES

The present invention is more specifically described in the examples provided below. However, these in no way limit the present invention. Unless specifically indicated otherwise, the "parts" in the following formulations are on a mass basis in all instances.

Fine Particle 1 Production Example

1. Hydrolysis Step
43.2 g RO water and 0.008 g acetic acid as catalyst were introduced into a 200-mL beaker and stirring was carried out at 45° C. To this were added 27.2 g tetraethoxysilane and 27.2 g dimethyldimethoxysilane, and stirring was carried out for 1.5 hours to obtain a starting solution.
2. Condensation Polymerization Step
An aqueous alkaline medium was prepared by introducing 68.8 g RO water, 340.0 g methanol, and 2.0 g of 28% aqueous ammonia into a 1000-mL beaker and stirring at 30° C. The starting solution prepared in the 1. Hydrolysis Step was added dropwise over 1 minute to this aqueous alkaline medium. After the dropwise addition of this starting solution, the mixture as such was stirred for 1.0 hour while holding at 20° C. to carry out a polycondensation reaction and obtain a polycondensation reaction solution.
3. Particulation Step
1,000 g RO water was introduced into a 2000-mL beaker and the polycondensation reaction solution obtained in the 2. Condensation Polymerization Step was added dropwise over 10 minutes while stirring at 25° C. The resulting mixture was heated to 40° C. and was stirred as such for 1.0 hour while holding at 40° C. to obtain a dispersion containing particles of a siloxane bond-containing silicon polymer.
4. Hydrophobing Step
27.1 g hexamethyldisilazane as hydrophobing agent was added to the dispersion containing particles of a siloxane bond-containing silicon polymer, obtained in the 3. Particulation Step, and stirring was performed for 2.5 hours at 60° C. Standing at quiescence was carried out for 5 minutes; the particles that precipitated to the bottom of the solution were recovered by suction filtration; and drying under reduced pressure was carried out for 24 hours at 120° C. to yield the fine particle 1. Fine particle 1 had a number-average primary particle diameter of 0.12 µm. The total pore volume of fine particle 1 was 0.45 cm³/g. The properties of fine particle 1 are given in Tables 1-1 and 1-2.

Fine Particle 2 Production Example

Fine particle 2 was obtained proceeding as in the Fine Particle 1 Production Example, but changing the hexamethyldisilazane used in the hydrophobing step to 16.3 g. The properties of the obtained fine particle 2 are given in Tables 1-1 and 1-2.

Fine Particle 3 Production Example

Fine particle 3 was obtained proceeding as in the Fine Particle 1 Production Example, but changing the hexamethyldisilazane used in the hydrophobing step to 37.9 g. The properties of the obtained fine particle 3 are given in Tables 1-1 and 1-2.

Fine Particle 4 Production Example

Fine particle 4 was obtained proceeding as in the Fine Particle 3 Production Example, but changing the stirring temperature in the hydrophobing step to 70° C. The properties of the obtained fine particle 4 are given in Tables 1-1 and 1-2.

Fine Particle 5 Production Example

Fine particle 5 was obtained proceeding as in the Fine Particle 2 Production Example, but changing the stirring temperature in the hydrophobing step to 50° C. The properties of the obtained fine particle 5 are given in Tables 1-1 and 1-2.

Fine Particle 6 Production Example

Fine particle 6 was obtained proceeding as in the Fine Particle 1 Production Example, but changing, in the condensation polymerization step, the stirring time for the mixture after the dropwise addition of the starting solution to 0.5 hours. The properties of the obtained fine particle 6 are given in Tables 1-1 and 1-2.

Fine Particle 7 Production Example

Fine particle 7 was obtained proceeding as in the Fine Particle 1 Production Example, but changing, in the condensation polymerization step, the stirring time for the mixture after the dropwise addition of the starting solution to 1.5 hours. The properties of the obtained fine particle 7 are given in Tables 1-1 and 1-2.

Fine Particle 8 Production Example

Fine particle 8 was obtained proceeding as in the Fine Particle 1 Production Example, but, in the condensation polymerization step, changing the stirring temperature for the mixture after the dropwise addition of the starting solution to 15° C. and changing the stirring time to 0.5 hour. The properties of the obtained fine particle 8 are given in Tables 1-1 and 1-2.

Fine Particle 9 Production Example

Fine particle 9 was obtained proceeding as in the Fine Particle 1 Production Example, but changing, in the condensation polymerization step, the stirring temperature for the mixture after the dropwise addition of the starting solution to 25° C. and the stirring time to 1.5 hours. The properties of the obtained fine particle 9 are given in Tables 1-1 and 1-2.

Fine Particle 10 Production Example

Fine particle 10 was obtained proceeding as in the Fine Particle 1 Production Example, but changing the hydrophobic agent used in the hydrophobing step to octamethylcyclotetrasiloxane. The properties of the obtained fine particle 10 are given in Tables 1-1 and 1-2.

Fine Particle 11 Production Example

Fine particle 11 was obtained proceeding as in the Fine Particle 1 Production Example, but changing the hydrophobic agent used in the hydrophobing step to chlorotrimethylsilane. The properties of the obtained fine particle 11 are given in Tables 1-1 and 1-2.

Fine Particle 12 Production Example

Fine particle 12 was obtained proceeding as in the Fine Particle 1 Production Example, but changing the hydrophobic agent used in the hydrophobing step to trifluoropropyltrimethoxysilane. The properties of the obtained fine particle 12 are given in Tables 1-1 and 1-2.

Fine Particle 13 Production Example

Fine particle 13 was obtained proceeding as in the Fine Particle 1 Production Example, but changing the hydrophobic agent used in the hydrophobing step to dodecyltrimethoxysilane. The properties of the obtained fine particle 13 are given in Tables 1-1 and 1-2.

Fine Particle 14 Production Example

Fine particle 14 was obtained proceeding as in the Fine Particle 1 Production Example, but without adding a hydrophobic agent in the hydrophobing step. The properties of the obtained fine particle 14 are given in Tables 1-1 and 1-2.

Fine Particle 15 Production Example

Fine particle 15 was obtained proceeding as in the Fine Particle 14 Production Example, but in the hydrolysis step changing the tetraethoxysilane to 38.1 g and the dimethyldimethoxysilane to 16.3 g. The properties of the obtained fine particle 15 are given in Tables 1-1 and 1-2.

Fine Particle 16 Production Example

Fine particle 16 was obtained proceeding as in the Fine Particle 14 Production Example, but in the hydrolysis step changing the tetraethoxysilane to 16.3 g, trimethoxymethylsilane to 27.2 g, and the dimethyldimethoxysilane to 10.9 g. The properties of the obtained fine particle 16 are given in Tables 1-1 and 1-2.

Fine Particle 17 Production Example

Fine particle 17 was obtained proceeding as in the Fine Particle 14 Production Example, but in the hydrolysis step changing the tetraethoxysilane to 43.5 g and the dimethyldimethoxysilane to 10.9 g. The properties of the obtained fine particle 17 are given in Tables 1-1 and 1-2.

Fine Particle 18 Production Example

Fine particle 18 was obtained proceeding as in the Fine Particle 14 Production Example, but in the hydrolysis step changing the tetraethoxysilane to 16.3 g, the trimethoxymethylsilane to 24.5 g, and the dimethyldimethoxysilane to 13.6 g. The properties of the obtained fine particle 18 are given in Tables 1-1 and 1-2.

Fine Particle 19 Production Example

Fine particle 19 was obtained proceeding as in the Fine Particle 9 Production Example, but changing the stirring temperature in the particulation step to 50° C. and without adding a hydrophobic agent in the hydrophobing step. The properties of the obtained fine particle 19 are given in Tables 1-1 and 1-2.

Fine Particle 20 Production Example

Fine particle 20 was obtained proceeding as in the Fine Particle 8 Production Example, but changing the stirring temperature in the particulation step to 30° C. and without adding a hydrophobic agent in the hydrophobing step. The properties of the obtained fine particle 20 are given in Tables 1-1 and 1-2.

Fine Particle 21 Production Example

Fine particle 21 was obtained proceeding as in the Fine Particle 19 Production Example, but changing the amount of addition of the 28% aqueous ammonia in the condensation polymerization step to 2.5 g. The properties of the obtained fine particle 21 are given in Tables 1-1 and 1-2.

Fine Particle 22 Production Example

Fine particle 22 was obtained proceeding as in the Fine Particle 20 Production Example, but changing the amount of addition of the 28% aqueous ammonia in the condensation polymerization step to 1.0 g. The properties of the obtained fine particle 22 are given in Tables 1-1 and 1-2.

Fine Particle 23 Production Example

Fine particle 23 was obtained proceeding as in the Fine Particle 14 Production Example, but changing, in the condensation polymerization step, the RO water to 108.8 g and the methanol to 300.0 g. The properties of the obtained fine particle 23 are given in Tables 1-1 and 1-2.

Fine Particle 24 Production Example

Fine particle 24 was obtained proceeding as in the Fine Particle 14 Production Example, but changing, in the condensation polymerization step, the RO water to 28.8 g and the methanol to 380.0 g. The properties of the obtained fine particle 24 are given in Tables 1-1 and 1-2.

Fine Particle 25 Production Example

Fine particle 25 was obtained proceeding as in the Fine Particle 23 Production Example, but changing the amount of addition of the 28% aqueous ammonia in the condensation polymerization step to 2.5 g. The properties of the obtained fine particle 25 are given in Tables 1-1 and 1-2.

Fine Particle 26 Production Example

Fine particle 26 was obtained proceeding as in the Fine Particle 24 Production Example, but changing the amount of addition of the 28% aqueous ammonia in the condensation polymerization step to 1.5 g. The properties of the obtained fine particle 26 are given in Tables 1-1 and 1-2.

Fine Particle 27 Production Example

Fine particle 27 was obtained proceeding as in the Fine Particle 14 Production Example, but changing, in the hydrolysis step, the stirring time to 2.0 hours and the stirring temperature to 50° C. The properties of the obtained fine particle 27 are given in Tables 1-1 and 1-2.

Fine Particle 28 Production Example

Fine particle 28 was obtained proceeding as in the Fine Particle 14 Production Example, but changing the stirring time to 1.0 hour and the stirring temperature to 40° C. in the hydrolysis step and changing the 28% aqueous ammonia used in the condensation polymerization step to 2.5 g. The properties of the obtained fine particle 28 are given in Tables 1-1 and 1-2.

Fine Particle 29 Production Example

Fine particle 29 was obtained proceeding as in the Fine Particle 27 Production Example, but changing the amount of addition of the acetic acid in the hydrolysis step to 0.005 g. The properties of the obtained fine particle 29 are given in Tables 1-1 and 1-2.

Fine Particle 30 Production Example

Fine particle 30 was obtained proceeding as in the Fine Particle 28 Production Example, but changing the amount of addition of the acetic acid in the hydrolysis step to 0.010 g. The properties of the obtained fine particle 30 are given in Tables 1-1 and 1-2.

Fine Particle 31 Production Example

Fine particle 31 was obtained proceeding as in the Fine Particle 1 Production Example, but changing the following in the hydrolysis step: the tetraethoxysilane and dimethyldimethoxysilane were not added and 54.4 g trimethoxymethylsilane was added instead; the stirring temperature was changed to 30° C.; and the stirring time was changed to 0.5 hour. The properties of the obtained fine particle 31 are given in Tables 1-1 and 1-2.

Fine Particle 32 Production Example

Fine particle 32 was obtained proceeding as in the Fine Particle 22 Production Example, but in the hydrolysis step changing the tetraethoxysilane to 16.3 g and the dimethyldimethoxysilane to 38.1 g and carrying out the hydrophobing step as for fine particle 1. The properties of the obtained fine particle 32 are given in Tables 1-1 and 1-2.

Fine Particle 33 Production Example 124.0 g ethanol, 24.0 g RO water, and 10.0 g 28% aqueous ammonia were introduced into a 2000-mL beaker; this solution was adjusted to 70° C.; and 232.0 g tetraethoxysilane and 84.0 g 5.4% aqueous ammonia were both added dropwise over 0.5 hour while stirring. After the completion of this dropwise addition, stirring was continued for an additional 0.5 hour to carry out hydrolysis, thus yielding a dispersion of particles of a siloxane bond-containing silicon polymer. 150.0 g hexamethyldisilazane was added at room temperature to this dispersion of particles of a siloxane bond-containing silicon polymer, followed by heating this dispersion to 50 to 60° C. and stirring for 3.0 hours, recovering the particulate in the dispersion by suction filtration, and drying under reduced pressure for 24 hours at 120° C. to obtain fine particle 33. The properties of the obtained fine particle 33 are given in Tables 1-1 and 1-2.

Fine Particle 34 Production Example

Fine particle 34 was obtained proceeding as in the Fine Particle 1 Production Example, but changing, in the condensation polymerization step, the stirring time for the mixture after the dropwise addition of the starting solution to 1.5 hours and the stirring temperature to 30° C., and changing, in the particulation step, the stirring temperature to 25° C. and the stirring time to 0.5 hour. The properties of the obtained fine particle 34 are given in Tables 1-1 and 1-2.

TABLE 1-1

| fine particle No. | pore volume cm³/g | pore diameter nm | X m²/g | Y m²/g | Y/X | B/A | $^{29}$Si-NMR S4/SA | S3/SA | S2/SA | Young's modulus Mpa |
|---|---|---|---|---|---|---|---|---|---|---|
| 1 | 0.45 | 14 | 33 | 175 | 5.3 | 31.7 | 0.37 | 0.00 | 0.63 | 6200 |
| 2 | 0.45 | 14 | 33 | 175 | 5.3 | 31.7 | 0.37 | 0.00 | 0.63 | 6200 |
| 3 | 0.45 | 14 | 33 | 175 | 5.3 | 31.7 | 0.37 | 0.00 | 0.63 | 6200 |
| 4 | 0.45 | 14 | 33 | 175 | 5.3 | 31.7 | 0.37 | 0.00 | 0.63 | 6200 |
| 5 | 0.45 | 14 | 33 | 175 | 5.3 | 31.7 | 0.37 | 0.00 | 0.63 | 6200 |
| 6 | 0.47 | 14 | 33 | 184 | 5.6 | 31.7 | 0.37 | 0.00 | 0.63 | 6200 |
| 7 | 0.43 | 14 | 33 | 165 | 5.0 | 31.7 | 0.37 | 0.00 | 0.63 | 6200 |
| 8 | 0.50 | 14 | 33 | 189 | 5.7 | 31.7 | 0.37 | 0.00 | 0.63 | 6200 |
| 9 | 0.40 | 14 | 33 | 161 | 4.9 | 31.7 | 0.37 | 0.00 | 0.63 | 6200 |
| 10 | 0.45 | 14 | 33 | 175 | 5.3 | 31.7 | 0.37 | 0.00 | 0.63 | 6200 |
| 11 | 0.45 | 14 | 33 | 175 | 5.3 | 31.7 | 0.37 | 0.00 | 0.63 | 6200 |
| 12 | 0.45 | 14 | 33 | 175 | 5.3 | 31.7 | 0.37 | 0.00 | 0.63 | 6200 |
| 13 | 0.45 | 14 | 33 | 175 | 5.3 | 31.7 | 0.37 | 0.00 | 0.63 | 6200 |
| 14 | 0.45 | 14 | 33 | 175 | 5.3 | 31.7 | 0.37 | 0.00 | 0.63 | 6200 |
| 15 | 0.45 | 14 | 33 | 175 | 5.3 | 13.0 | 0.70 | 0.00 | 0.30 | 28000 |
| 16 | 0.45 | 14 | 33 | 175 | 5.3 | 40.0 | 0.30 | 0.50 | 0.20 | 2000 |
| 17 | 0.45 | 14 | 33 | 175 | 5.3 | 10.0 | 0.80 | 0.00 | 0.20 | 35000 |
| 18 | 0.45 | 14 | 33 | 175 | 5.3 | 43.0 | 0.30 | 0.45 | 0.25 | 1400 |
| 19 | 0.40 | 15 | 33 | 106 | 3.2 | 31.7 | 0.37 | 0.00 | 0.63 | 6200 |
| 20 | 0.60 | 12 | 33 | 248 | 7.5 | 31.7 | 0.37 | 0.00 | 0.63 | 6200 |
| 21 | 0.37 | 17 | 33 | 83 | 2.5 | 31.7 | 0.37 | 0.00 | 0.63 | 6200 |

TABLE 1-1-continued

| fine particle No. | pore volume cm³/g | pore diameter nm | X m²/g | Y m²/g | Y/X | ²⁹Si-NMR B/A | S4/SA | S3/SA | S2/SA | Young's modulus Mpa |
|---|---|---|---|---|---|---|---|---|---|---|
| 22 | 0.90 | 10 | 33 | 284 | 8.6 | 31.7 | 0.37 | 0.00 | 0.63 | 6200 |
| 23 | 0.45 | 8  | 33 | 175 | 8.6 | 31.7 | 0.37 | 0.00 | 0.63 | 6200 |
| 24 | 0.45 | 18 | 33 | 175 | 8.6 | 31.7 | 0.37 | 0.00 | 0.63 | 6200 |
| 25 | 0.45 | 5  | 33 | 175 | 8.6 | 31.7 | 0.37 | 0.00 | 0.63 | 6200 |
| 26 | 0.45 | 25 | 33 | 175 | 8.6 | 31.7 | 0.37 | 0.00 | 0.63 | 6200 |
| 27 | 0.45 | 14 | 56 | 245 | 4.4 | 31.7 | 0.37 | 0.00 | 0.63 | 6200 |
| 28 | 0.45 | 14 | 25 | 170 | 6.8 | 31.7 | 0.37 | 0.00 | 0.63 | 6200 |
| 29 | 0.45 | 14 | 49 | 268 | 5.5 | 31.7 | 0.37 | 0.00 | 0.63 | 6200 |
| 30 | 0.45 | 14 | 23 | 168 | 7.3 | 31.7 | 0.37 | 0.00 | 0.63 | 6200 |
| 31 | 0.33 | 14 | 33 | 175 | 5.3 | 25.0 | 0.00 | 1.00 | 0.00 | 6200 |
| 32 | 1.10 | 14 | 33 | 175 | 5.3 | 31.7 | 0.30 | 0.00 | 0.70 | 1500 |
| 33 | 0.42 | 14 | 33 | 175 | 5.3 | 0.0  | 1.00 | 0.00 | 0.00 | 70000 |
| 34 | 0.25 | 8  | 33 | 114 | 3.5 | 31.7 | 0.37 | 0.00 | 0.63 | 6200 |

TABLE 1-2

| fine particle No. | dC atomic % | hydrophobic agent for surface treatment | hydrophobicity % | particle diameter μm | circularity |
|---|---|---|---|---|---|
| 1  | 33 | hexamethyldisilazane | 55 | 0.12 | 0.90 |
| 2  | 30 | hexamethyldisilazane | 50 | 0.12 | 0.90 |
| 3  | 37 | hexamethyldisilazane | 59 | 0.12 | 0.90 |
| 4  | 38 | hexamethyldisilazane | 62 | 0.12 | 0.90 |
| 5  | 28 | hexamethyldisilazane | 45 | 0.12 | 0.90 |
| 6  | 28 | hexamethyldisilazane | 45 | 0.12 | 0.86 |
| 7  | 28 | hexamethyldisilazane | 45 | 0.12 | 0.94 |
| 8  | 28 | hexamethyldisilazane | 45 | 0.12 | 0.84 |
| 9  | 28 | hexamethyldisilazane | 45 | 0.12 | 0.97 |
| 10 | 28 | octamethylcyclotetrasiloxane | 45 | 0.12 | 0.90 |
| 11 | 28 | chlorotrimethylsilane | 45 | 0.12 | 0.90 |
| 12 | 28 | trifluoropropyltrimethoxysilane | 45 | 0.12 | 0.90 |
| 13 | 28 | dodecyltrimethoxysilane | 45 | 0.12 | 0.90 |
| 14 | 22 | none | 40 | 0.12 | 0.90 |
| 15 | 12 | none | 32 | 0.12 | 0.90 |
| 16 | 48 | none | 40 | 0.12 | 0.90 |
| 17 | 8  | none | 28 | 0.12 | 0.90 |
| 18 | 52 | none | 43 | 0.12 | 0.90 |
| 19 | 22 | none | 40 | 0.12 | 0.90 |
| 20 | 22 | none | 40 | 0.12 | 0.90 |
| 21 | 22 | none | 40 | 0.12 | 0.90 |
| 22 | 22 | none | 40 | 0.12 | 0.90 |
| 23 | 22 | none | 40 | 0.12 | 0.90 |
| 24 | 22 | none | 40 | 0.12 | 0.90 |
| 25 | 22 | none | 40 | 0.12 | 0.90 |
| 26 | 22 | none | 40 | 0.12 | 0.90 |
| 27 | 22 | none | 40 | 0.06 | 0.90 |
| 28 | 22 | none | 40 | 0.29 | 0.90 |
| 29 | 35 | hexamethyldisilazane | 55 | 0.04 | 0.90 |
| 30 | 35 | hexamethyldisilazane | 55 | 0.32 | 0.90 |
| 31 | 30 | hexamethyldisilazane | 55 | 0.12 | 0.90 |
| 32 | 38 | hexamethyldisilazane | 55 | 0.12 | 0.90 |
| 33 | 15 | hexamethyldisilazane | 58 | 0.12 | 0.90 |
| 34 | 30 | hexamethyldisilazane | 55 | 0.12 | 0.90 |

In the Tables 1-1 and 1-2, the pore volume refers to the total pore volume and the pore diameter refers to the volume-average diameter of the pores. In addition, the particle diameter is the number-average primary particle diameter and the circularity is the average circularity. The unit for the hydrophobicity is volume %.

Polyester Resin A1 Production Example

| polyoxypropylene(2.2)-2,2-bis(4-hydroxyphenyl)propane | 76.9 parts (0.167 mol) |
| terephthalic acid (TPA) | 25.0 parts (0.145 mol) |
| adipic acid | 8.0 parts (0.054 mol) |
| titanium tetrabutoxide | 0.5 parts |

The preceding materials were introduced into a glass 4-liter four-neck flask, which was fitted with a thermometer, stirring rod, condenser, and nitrogen introduction line and placed in a mantle heater. The interior of the flask was then substituted with nitrogen gas, followed by gradually increasing the temperature while stirring and reacting for 4 hours while stirring at a temperature of 200° C. (first reaction step). Then, 1.2 parts (0.006 mol) of trimellitic anhydride (TMA) was added and a reaction was run for 1 hour at 180° C. (second reaction step) to obtain polyester res A1. The acid value of this polyester resin A1 was 5 mg KOH/g.

Polyester Resin A2 Production Example

| polyoxypropylene(2.2)-2,2-bis(4-hydroxyphenyl)propane | 71.3 parts (0.155 mol) |
| terephthalic acid | 24.1 parts (0.145 mol) |
| titanium tetrabutoxide | 0.6 parts |

The preceding materials were introduced into a glass 4-liter four-neck flask, which was fitted with a thermometer, stirring rod, condenser, and nitrogen introduction line and placed in a mantle heater. The interior of the flask was then substituted with nitrogen gas, followed by gradually increasing the temperature while stirring and reacting for 2 hours while stirring at a temperature of 200° C. Then, 5.8 parts (0.030 mol %) of trimellitic anhydride was added and a reaction was run for 10 hours at 180° C. to obtain polyester resin A2. The acid value of this polyester resin A2 was 10 mg KOH/g.

Toner Particle 1 Production Example

| polyester resin A1 | 70.0 parts |
| polyester resin A2 | 30.0 parts |
| Fischer-Tropsch wax (peak temperature of maximum endothermic peak = 78° C.) | 5.0 parts |

-continued

| C. I. Pigment Blue 15:3 | 5.0 parts |
|---|---|
| aluminum 3,5-di-t-butylsalicylate compound | 0.1 parts |

The starting materials indicated in this formulation were mixed using a Henschel mixer (Model FM-75, Nippon Coke & Engineering Co., Ltd.) at a rotation rate of 20 s$^{-1}$ and a rotation time of 5 minutes, followed by kneading using a twin-screw kneader (Model PCM-30, Ikegai Corporation) set to a temperature of 125° C. and a rotation rate of 300 rpm. The resulting kneaded material was cooled and coarsely pulverized to a diameter of 1 mm and below using a hammer mill to obtain a coarsely pulverized material. The resulting coarsely pulverized material was finely pulverized using a mechanical pulverizer (T-250, Freund-Turbo Corporation).

Classification was performed using a rotary classifier (200TSP, Hosokawa Micron Corporation) to yield toner particle 1. With regard to the operating conditions for the rotary classifier (200TSP, Hosokawa Micron Corporation), classification was carried out at a classification rotor rotation rate of 50.0 s$^{-1}$. The resulting toner particle 1 had a weight-average particle diameter (D4) of 5.9 μm.

Toner 1 Production Example toner particle 1 100 parts
fine particle 1 6.0 parts
Toner 1 was obtained by mixing these materials using a Model FM-10C Henschel mixer (Mitsui Miike Chemical Engineering Machinery Co., Ltd.) at a rotation rate of 30 s$^{-1}$ for a rotation time of 10 min.

Toners 2 to 38 Production Example

Toners 2 to 38 were obtained by carrying out production as in the Toner 1 Production Example, but changing the type of fine particle and its amount of addition to that shown in Table 2.

TABLE 2

| toner No. | toner particle No. | fine particle No. | amount of addition (number of parts) |
|---|---|---|---|
| toner 1 | toner particle 1 | fine particle 1 | 6.0 |
| toner 2 | toner particle 1 | fine particle 1 | 0.2 |
| toner 3 | toner particle 1 | fine particle 1 | 18.0 |
| toner 4 | toner particle 1 | fine particle 1 | 21.0 |
| toner 5 | toner particle 1 | fine particle 1 | 0.04 |
| toner 6 | toner particle 1 | fine particle 2 | 6.0 |
| toner 7 | toner particle 1 | fine particle 3 | 6.0 |
| toner 8 | toner particle 1 | fine particle 4 | 6.0 |
| toner 9 | toner particle 1 | fine particle 5 | 6.0 |
| toner 10 | toner particle 1 | fine particle 6 | 6.0 |
| toner 11 | toner particle 1 | fine particle 7 | 6.0 |
| toner 12 | toner particle 1 | fine particle 8 | 6.0 |
| toner 13 | toner particle 1 | fine particle 9 | 6.0 |
| toner 14 | toner particle 1 | fine particle 10 | 6.0 |
| toner 15 | toner particle 1 | fine particle 11 | 6.0 |
| toner 16 | toner particle 1 | fine particle 12 | 6.0 |
| toner 17 | toner particle 1 | fine particle 13 | 6.0 |
| toner 18 | toner particle 1 | fine particle 14 | 6.0 |
| toner 19 | toner particle 1 | fine particle 15 | 6.0 |
| toner 20 | toner particle 1 | fine particle 16 | 6.0 |
| toner 21 | toner particle 1 | fine particle 17 | 6.0 |
| toner 22 | toner particle 1 | fine particle 18 | 6.0 |
| toner 23 | toner particle 1 | fine particle 19 | 6.0 |
| toner 24 | toner particle 1 | fine particle 20 | 6.0 |
| toner 25 | toner particle 1 | fine particle 21 | 6.0 |
| toner 26 | toner particle 1 | fine particle 22 | 6.0 |
| toner 27 | toner particle 1 | fine particle 23 | 6.0 |
| toner 28 | toner particle 1 | fine particle 24 | 6.0 |
| toner 29 | toner particle 1 | fine particle 25 | 6.0 |
| toner 30 | toner particle 1 | fine particle 26 | 6.0 |
| toner 31 | toner particle 1 | fine particle 27 | 6.0 |
| toner 32 | toner particle 1 | fine particle 28 | 6.0 |
| toner 33 | toner particle 1 | fine particle 29 | 6.0 |
| toner 34 | toner particle 1 | fine particle 30 | 6.0 |
| toner 35 | toner particle 1 | fine particle 31 | 6.0 |
| toner 36 | toner particle 1 | fine particle 32 | 6.0 |
| toner 37 | toner particle 1 | fine particle 33 | 6.0 |
| toner 38 | toner particle 1 | fine particle 34 | 6.0 |

Carrier 1 Production Example magnetite 1, having a number-average particle diameter of 0.30 μm (65 Am$^2$/kg intensity of magnetization in a 1000/4π (kA/m) magnetic field)
magnetite 2, having a number-average particle diameter of 0.50 μm (65 Am$^2$/kg intensity of magnetization in a 1000/4π (kA/m) magnetic field)

4.0 parts of a silane compound (3-(2-aminoethylamino-propyl)trimethoxysilane) was added to 100 parts of each of these materials, and each of these fine particles was treated by high-speed stirring in a vessel at ≥100° C.
Phenol: 10 Mass %
 formaldehyde solution: 6 mass %
(40 Mass % Formaldehyde, 10 Mass % Methanol, 50 Mass % Water)
 above-described silane compound-treated magnetite 1: 58 mass %
 above-described silane compound-treated magnetite 2: 26 mass %

These materials, 5 parts 28 mass % aqueous ammonia, and 20 parts water were introduced into a flask, the temperature was raised to 85° C. in 30 minutes while mixing, and, while holding this, a polymerization reaction was carried out for 3 hours and the produced phenolic resin was cured. The cured phenolic resin was then cooled to 30° C., additional water was added, the supernatant was subsequently removed, and the precipitation was washed with water and then dried. This was followed by drying under reduced pressure (at or below 5 mmHg) at a temperature of 60° C. to obtain a magnetic body-dispersed spherical carrier 1. The 50% particle diameter on a volume basis (D50) was 34.2 μm.

Two-Component Developer 1 Production Example 8.0 parts of toner 1 was added to 92.0 parts of carrier 1 and a two-component developer 1 was obtained by mixing with a V-mixer (V-20, Seishin Enterprise Co., Ltd.).

Two-Component Developers 2 to 38 Production Example

Two-component developers 2 to 38 were produced by carrying out the same procedure as in the Two-Component Developer 1 Production Example, but changing the toner as indicated in Table 3.

TABLE 3

| two-component developer No. | toner No. | carrier No. |
|---|---|---|
| two-component developer 1 | toner 1 | carrier 1 |
| two-component developer 2 | toner 2 | carrier 1 |
| two-component developer 3 | toner 3 | carrier 1 |
| two-component developer 4 | toner 4 | carrier 1 |
| two-component developer 5 | toner 5 | carrier 1 |
| two-component developer 6 | toner 6 | carrier 1 |
| two-component developer 7 | toner 7 | carrier 1 |
| two-component developer 8 | toner 8 | carrier 1 |
| two-component developer 9 | toner 9 | carrier 1 |
| two-component developer 10 | toner 10 | carrier 1 |
| two-component developer 11 | toner 11 | carrier 1 |
| two-component developer 12 | toner 12 | carrier 1 |
| two-component developer 13 | toner 13 | carrier 1 |
| two-component developer 14 | toner 14 | carrier 1 |
| two-component developer 15 | toner 15 | carrier 1 |
| two-component developer 16 | toner 16 | carrier 1 |
| two-component developer 17 | toner 17 | carrier 1 |
| two-component developer 18 | toner 18 | carrier 1 |
| two-component developer 19 | toner 19 | carrier 1 |
| two-component developer 20 | toner 20 | carrier 1 |
| two-component developer 21 | toner 21 | carrier 1 |
| two-component developer 22 | toner 22 | carrier 1 |
| two-component developer 23 | toner 23 | carrier 1 |
| two-component developer 24 | toner 24 | carrier 1 |
| two-component developer 25 | toner 25 | carrier 1 |
| two-component developer 26 | toner 26 | carrier 1 |
| two-component developer 27 | toner 27 | carrier 1 |
| two-component developer 28 | toner 28 | carrier 1 |
| two-component developer 29 | toner 29 | carrier 1 |
| two-component developer 30 | toner 30 | carrier 1 |
| two-component developer 31 | toner 31 | carrier 1 |
| two-component developer 32 | toner 32 | carrier 1 |
| two-component developer 33 | toner 33 | carrier 1 |
| two-component developer 34 | toner 34 | carrier 1 |
| two-component developer 35 | toner 35 | carrier 1 |
| two-component developer 36 | toner 36 | carrier 1 |
| two-component developer 37 | toner 37 | carrier 1 |
| two-component developer 38 | toner 38 | carrier 1 |

Toner Evaluation Methods (1) Measurement of Image Density Variations

An imagePress C800 full-color copier from Canon, Inc. was used as the image-forming apparatus. A two-component developer as described above was introduced into the cyan developing device of the image-forming apparatus, toner as described above was introduced into the cyan toner container, and the evaluations described in the following were carried out. The following modification was made: the mechanism in the developing device for discharging excess magnetic carrier from the developing device was removed. GF-0081 general-purpose paper (A4, areal weight=81.4 g/m², sold by Canon Marketing Japan Inc.) was used as the paper used in the evaluations.

Adjustment was carried out such that the toner laid-on level on the paper was 0.45 mg/cm² for the FFh image (solid image). FFh is a value that indicates 256 gradations in hexadecimal notation; 00h is the 1st gradation (white background) of the 256 gradations; and FF is the 256th gradation (solid region) of the 256 gradations. A 7,000-sheet image-output test at a 1% image ratio was first carried out. Paper feed was carried out during the 7,000-sheet continuous paper feed using the same developing conditions and transfer conditions as for the first print (no calibration).

A 7,000-sheet image output test at an 80% image ratio was then performed. Paper feed was carried out during the 7,000-sheet continuous paper feed using the same developing conditions and transfer conditions as for the first print (no calibration). The evaluation was performed as follows: after the print run at the 1% image ratio, the image density of the first print in the print run at the 80% image ratio was designated the initial density, and the density was measured on the image in the 7,000th print in the print run at the 80% image ratio.

This test was carried out in a normal-temperature, normal-humidity environment (N/N, temperature of 25° C., 55% relative humidity) and in a high-temperature, high-humidity environment (H/H, temperature of 30° C., 80% relative humidity). An X-Rite color reflection densitometer (500 Series, X-Rite, Incorporated) was used to measure the initial density and the density of the image on the 7,000th print in the print run at the 80% image ratio. Using this difference Δ, ranking was performed using the following criteria. A score of D or better was regarded as good.

(Evaluation Criteria, Image Density Difference Δ)
  A: less than 0.02
  B: equal to or greater than 0.02, but less than 0.05
  C: equal to or greater than 0.05, but less than 0.10
  D: equal to or greater than 0.10, but less than 0.15
  E: equal to or greater than 0.15

(2) Method for Evaluating the Fogging in Non-Image Areas (White Background Region) After Durability Testing The evaluation was performed using a modified version of an imagePress C800, a full-color copier from Canon, Inc., as the image-forming apparatus, with the two-component developer 1 introduced into the developing device at the cyan station. Adjustment was carried out such that the toner laid-on level on the paper was 0.45 mg/cm² for the FFh image (solid image). N/N and H/H environments were used for the environment during the evaluation, and GFC-081 general-purpose copy paper (A4, areal weight=81.4 g/m², sold by Canon Marketing Japan Inc.) was used as the paper used in the evaluations. In each environment, the fogging of the white background region was measured after the output of 70,000 prints of a 1 cm×1 cm FFh image in the center of the A4 paper.

The reflectance Dr (%) of the evaluation paper prior to image output was measured using a reflectometer ("Reflectometer Model TC-6DS", Tokyo Denshoku Co., Ltd.). The reflectance Ds (%) of the OOH image region (white background region) was measured after the durability test (70,001st print). The fogging (%) was calculated using the following formula from the obtained Dr and Ds.

$$\text{fogging (\%)} = Dr\ (\%) - Ds\ (\%)$$

The results of the evaluation were ranked using the following criteria. A score of D or better was regarded as good.

(Evaluation Criteria for Fogging (%))
  A: less than 1.0%
  B: equal to or greater than 1.0% and less than 1.5%
  C: equal to or greater than 1.5% and less than 2.0%
  D: equal to or greater than 2.0% and less than 2.5%
  E: equal to or greater than 2.5%

(3) Method for Evaluating the Charge Stability

The triboelectric charge quantity on the toner was determined by suctioning off and collecting the toner on the electrostatic latent image bearing member using a cylindrical metal tube and cylindrical filter. Specifically, the triboelectric charge quantity on the toner on the electrostatic latent image bearing member was measured using a Faraday cage. A Faraday cage is a coaxial double cylinder wherein the inner cylinder is insulated from the outer cylinder. When a charged body carrying a charge quantity Q is introduced into this inner cylinder, due to electrostatic induction this is the same as the presence of a metal cylinder carrying charge quantity Q. This induced charge quantity was measured with an electrometer (Keithley 6517A, Keithley Instruments, Inc.), and the charge quantity Q (mC) divided by the mass M (kg) of the toner in the inner cylinder, or Q/M, was taken to be the triboelectric charge quantity of the toner.

triboelectric charge quantity of the toner (mC/kg) =Q/M evaluation image: a 2 cm×5 cm FFh image positioned in the center of the A4 paper First, the aforementioned evaluation image was formed on the electrostatic latent image bearing member; the rotation of the electrostatic latent image bearing member was stopped prior to transfer to the intermediate transfer member; and the toner on the electrostatic latent image bearing member was suctioned off and collected using a cylindrical metal tube and a cylindrical filter and the [initial Q/M] was measured. Then, the developing device inserted in the evaluation machine was held as such for 4 weeks in the H/H environment, after which the same operation as prior to holding was carried out and the charge quantity per unit mass Q/M (mC/kg) on the electrostatic latent image bearing member was measured. Using this initial Q/M per unit mass on the electrostatic latent image bearing member and the post-holding Q/M per unit mass on the electrostatic latent image bearing member, the percentage change in Q/M post-holding ([initial Q/M]—[Q/M after holding in the H/H environment])×100/[initial Q/M] was calculated and scored using the following criteria. A score of D or better was regarded as good.

(Evaluation Criteria)
A: the percentage change is less than 2%
B: the percentage change is greater than or equal to 2%, but less than 5%
C: the percentage change is greater than or equal to 5%, but less than 10%
D: the percentage change is greater than or equal to 10%, but less than 15%
E: the percentage change is at least 15%

Results of the Evaluations for Examples 1 to 32

The results of the evaluations for Examples 1 to 32 are given in Table 4. Results of the Evaluations for Comparative Examples 1 to 6

The results of the evaluations for Comparative Examples 1 to 6 are given in Table 4.

TABLE 4

|  | two-component developer No. | image density change | | | | fogging after durability testing | | | | charge stability |  |
|---|---|---|---|---|---|---|---|---|---|---|---|
|  |  | HH | | NN | | HH | | NN | | HH percentage | |
|  |  | Δ | rank | Δ | rank | fogging value % | rank | fogging value % | rank | change % | rank |
| Example 1 | 1 | 0.01 | A | 0.01 | A | 0.2 | A | 0.2 | A | 0 | A |
| Example 2 | 2 | 0.02 | A | 0.01 | A | 1.1 | B | 0.2 | A | 1 | A |
| Example 3 | 3 | 0.02 | A | 0.01 | A | 0.3 | A | 0.2 | A | 1 | A |
| Example 4 | 4 | 0.03 | B | 0.02 | A | 0.5 | A | 0.4 | A | 1 | A |
| Example 5 | 5 | 0.03 | B | 0.01 | A | 0.6 | A | 0.4 | A | 1 | A |
| Example 6 | 6 | 0.02 | A | 0.02 | A | 1.3 | B | 0.3 | A | 3 | B |
| Example 7 | 7 | 0.02 | A | 0.02 | A | 1.1 | B | 0.3 | A | 2 | B |
| Example 8 | 8 | 0.03 | B | 0.02 | A | 1.1 | B | 0.5 | A | 3 | B |
| Example 9 | 9 | 0.03 | B | 0.01 | A | 1.3 | B | 0.5 | A | 4 | B |
| Example 10 | 10 | 0.04 | B | 0.01 | A | 1.2 | B | 0.7 | A | 3 | B |
| Example 11 | 11 | 0.04 | B | 0.01 | A | 1.0 | B | 0.6 | A | 4 | B |
| Example 12 | 12 | 0.04 | B | 0.04 | B | 1.3 | B | 0.8 | A | 1 | A |
| Example 13 | 13 | 0.04 | B | 0.04 | B | 1.2 | B | 0.7 | A | 1 | A |
| Example 14 | 14 | 0.04 | B | 0.04 | B | 1.3 | B | 0.5 | A | 1 | A |
| Example 15 | 15 | 0.04 | B | 0.04 | B | 1.3 | B | 0.5 | A | 1 | A |
| Example 16 | 16 | 0.04 | B | 0.04 | B | 1.4 | B | 0.6 | A | 3 | B |
| Example 17 | 17 | 0.04 | B | 0.04 | B | 1.1 | B | 0.5 | A | 4 | B |
| Example 18 | 18 | 0.05 | C | 0.04 | B | 1.4 | B | 0.8 | A | 4 | B |
| Example 19 | 19 | 0.08 | C | 0.03 | B | 1.2 | B | 0.7 | A | 4 | B |
| Example 20 | 20 | 0.04 | B | 0.01 | A | 1.4 | B | 0.9 | A | 3 | B |
| Example 21 | 21 | 0.08 | C | 0.08 | C | 1.8 | C | 0.9 | A | 7 | C |
| Example 22 | 22 | 0.09 | C | 0.08 | C | 1.6 | C | 0.8 | A | 3 | B |
| Example 23 | 23 | 0.05 | C | 0.04 | B | 1.3 | B | 0.2 | A | 4 | B |
| Example 24 | 24 | 0.05 | C | 0.04 | B | 1.4 | B | 0.2 | A | 3 | B |
| Example 25 | 25 | 0.08 | C | 0.08 | C | 1.7 | C | 1.1 | B | 3 | B |
| Example 26 | 26 | 0.08 | C | 0.08 | C | 1.6 | C | 1.1 | B | 7 | C |
| Example 27 | 27 | 0.04 | B | 0.01 | A | 1.6 | C | 1.1 | B | 4 | B |
| Example 28 | 28 | 0.06 | C | 0.03 | B | 1.8 | C | 1.1 | B | 6 | C |
| Example 29 | 29 | 0.12 | D | 0.08 | C | 1.8 | C | 1.1 | B | 8 | C |
| Example 30 | 30 | 0.12 | D | 0.08 | C | 1.7 | C | 1.1 | B | 7 | C |
| Example 31 | 31 | 0.08 | C | 0.03 | B | 2.1 | D | 1.1 | B | 7 | C |
| Example 32 | 32 | 0.08 | C | 0.03 | B | 1.3 | B | 0.2 | A | 3 | B |
| Comparative Example 1 | 33 | 0.15 | E | 0.12 | D | 2.5 | E | 1.8 | C | 16 | E |
| Comparative Example 2 | 34 | 0.15 | E | 0.12 | D | 2.6 | E | 1.7 | C | 17 | E |
| Comparative Example 3 | 35 | 0.15 | E | 0.12 | D | 2.5 | E | 1.6 | C | 16 | E |
| Comparative Example 4 | 36 | 0.15 | E | 0.12 | D | 2.5 | E | 2.1 | D | 17 | E |
| Comparative Example 5 | 37 | 0.16 | E | 0.16 | E | 2.5 | E | 2.3 | D | 16 | E |
| Comparative Example 6 | 38 | 0.15 | E | 0.11 | D | 2.5 | E | 2.0 | D | 15 | E |

This disclosure relates to following constitutions.
Construction 1
A fine particle of a silicon polymer, wherein
the fine particle has pores;
the total pore volume of the fine particle is 0.35 to 1.00 cm$^3$/g;

a number-average primary particle diameter of the fine particle is 0.05 to 0.30 μm;

the silicon polymer has a siloxane bond and an Si—$R^1$ bond;

$R^1$ represents a $C_{1-6}$ alkyl group; and designating, with reference to a chart obtained by $^{29}$Si-NMR measurement of the fine particle, A as a total peak area corresponding to the silicon polymer, and B as a peak area corresponding to A and B satisfy a following formula (1):

$$10.0 \leq B/A \times 100 \leq 45.0 \tag{1}$$

Construction 2

The fine particle according to construction 1, wherein the volume-average diameter of the pores of the fine particle is 7 to 20 nm.

Construction 3

The fine particle according to construction 1 or 2, wherein, designating X (m$^2$/g) as a theoretical BET specific surface area of the fine particle and Y (m$^2$/g) as a BET specific surface area measured for the fine particle using a multipoint BET method, X and Y satisfy a following formula (2):

$$3.0 \leq Y/X \leq 8.0 \tag{2}$$

Construction 4

The fine particle according to any one of constructions 1 to 3, wherein designating, with reference to the chart obtained by $^{29}$Si-NMR measurement of the fine particle, SA as a total peak area corresponding to a silicon polymer, S4 as a peak area corresponding to a Q unit structure, S3 as a peak area corresponding to a T unit structure, and S2 as a peak area corresponding to a D unit structure, SA, S4, S3, and S2 satisfy following formulas (I), (II), and (III):

$$0.20 \leq S4/SA \leq 0.60 \tag{I}$$

$$0 \leq S3/SA \leq 0.50 \tag{II}$$

$$0.20 \leq S2/SA \leq 0.70 \tag{III}$$

Construction 5

The fine particle according to any one of constructions 1 to 4, wherein the fine particle has a Young's modulus of 1,500 to 30,000 MPa.

Construction 6

The fine particle according to any one of constructions 1 to 5, wherein designating, in x-ray photoelectron spectroscopic measurement of a surface of the fine particle, dSi as an element concentration of a silicon element, dO as an element concentration of an oxygen atom, dC as an element concentration of a carbon atom, and designating their total to be 100.0 atomic %, dC is 10.0 to 50.0 atomic %.

Construction 7

The fine particle according to any one of constructions 1 to 6, wherein a surface of the fine particle has been treated with at least one compound selected from the group consisting of alkylsilazane compounds, alkylalkoxysilane compounds, chlorosilane compounds, fluoroalkylsilane compounds, and siloxane compounds.

Construction 8

The fine particle according to any one of constructions 1 to 7, wherein an average circularity of the fine particle is 0.85 to 0.95.

Construction 9

The fine particle according to any one of constructions 1 to 8, wherein the fine particle has a hydrophobicity as measured by a methanol titration method of 50 to 60 volume %.

Construction 10

The fine particle according to any one of constructions 1 to 9, wherein the silicon polymer is a condensation polymer of at least one silicon compound selected from the group consisting of silicon compounds having a structure given by a following formula (A);

in formula (A), $R^{12}$, $R^{13}$, $R^{14}$, and $R^{15}$ are each independently a $C_{1-6}$ alkyl group, a phenyl group, or a reactive group wherein the reactive group is a halogen atom, hydroxy group, acetoxy group, or a $C_{1-6}$ alkoxy group, and at least one of $R^{12}$, $R^{13}$, $R^{14}$, and $R^{15}$ is the reactive group.

Construction 11

An external additive for a toner, comprising the fine particle according to any one of constructions 1 to 10.

Construction 12

A toner comprising a toner particle and an external additive for a toner, wherein the toner particle comprises a binder resin, and the external additive for the toner is the external additive for the toner according to construction 11.

Construction 13

The toner according to construction 12, wherein a content in the toner of the external additive for a toner is 0.1 to 20.0 mass parts per 100 mass parts of the toner particle.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-145416, filed Sep. 7, 2021, and Japanese Patent Application No. 2022-119074, filed Jul. 26, 2022 which are hereby incorporated by reference herein in their entirety.

What is claimed is:

1. A fine particle, comprising:

a silicon polymer having a siloxane bond and an Si—$R^1$ bond, where $R^1$ represents an alkyl group having 1 to 6 carbon atoms;

the fine particle having pores;

a total pore volume of the fine particle being 0.35 to 1.00 cm$^3$/g;

a volume-average diameter of the pores of the fine particle being 7 to 20 nm; and a number-average primary particle diameter of the fine particle being 0.05 to 0.30 μm, where $$10.0 \leq B/A \times 100 \leq 45.0$$

and when with reference to a chart obtained by $^{29}$Si-NMR measurement of the fine particle, A is a total peak area corresponding to the silicon polymer, and B is a peak area corresponding to Si—$R^1$.

2. The fine particle according to claim 1, where $3.0 \leq Y/X \leq 8.0$ when X (m$^2$/g) is a theoretical BET specific surface area of the fine particle and Y (m$^2$/g) is a BET specific surface area measured for the fine particle using a multipoint BET method.

3. The fine particle according to claim 1, where $0.20 \leq S4/SA \leq 0.60$ $0 \leq S3/SA \leq 0.50$ and $0.20 \leq S2/SA \leq 0.70$ when, with reference to the chart obtained by $^{29}$Si-NMR measurement of the fine particle, SA is a total peak area corresponding to a silicon polymer, S4 is a peak area corresponding to a Q unit structure, S3 is a peak area corresponding to a T unit structure, and S2 is a peak area corresponding to a D unit structure.

4. The fine particle according to claim 1, wherein the fine particle has a Young's modulus of 1,500 to 30,000 MPa.

5. The fine particle according to claim 1, where dC is 10.0 to 50.0 atomic % when, in x-ray photoelectron spectroscopic measurement of a surface of the fine particle, dSi is an element concentration of a silicon element, dO is an element concentration of an oxygen atom, dC is an element concentration of a carbon atom, and dSi+dO+dC is 100.0 atomic %.

6. The fine particle according to claim 1, wherein a surface of the fine particle has been treated with at least one compound selected from the group consisting of alkylsilazane compounds, alkylalkoxysilane compounds, chlorosilane compounds, fluoroalkylsilane compounds, and siloxane compounds.

7. The fine particle according to claim 1, wherein an average circularity of the fine particle is 0.85 to 0.95.

8. The fine particle according to claim 1, wherein the fine particle has a hydrophobicity as measured by a methanol titration method of 50 to 60 volume %.

9. The fine particle according to claim 1, wherein the silicon polymer is a condensation polymer of at least one silicon compound having a structure according to formula (A)

(A)

where $R^{12}$, $R^{13}$, $R^{14}$ and $R^{15}$ are independently an alkyl group having 1 to 6 carbon atoms, a phenyl group or a reactive group wherein the reactive group is a halogen atom, hydroxy group, acetoxy group or an alkoxy group having 1 to 6 carbon atoms, and at least one of $R^{12}$, $R^{13}$, $R^{14}$ and $R^{15}$ is the reactive group.

10. An external additive for a toner, comprising the fine particle according to claim 1.

11. A toner comprising a toner particle and an external additive for a toner, wherein the toner particle comprises a binder resin, and the external additive for toner according to claim 10.

12. The toner according to claim 11, wherein a content in the toner of the external additive is 0.1 to 20.0 mass parts per 100 mass parts of the toner particle.

* * * * *